US010951895B2

(12) United States Patent
Sun et al.

(10) Patent No.: US 10,951,895 B2
(45) Date of Patent: Mar. 16, 2021

(54) CONTEXT MODEL SELECTION BASED ON CODING UNIT CHARACTERISTICS

(71) Applicant: Alibaba Group Holding Limited, Grand Cayman (KY)

(72) Inventors: Yu-Chen Sun, Bellevue, WA (US); Jian Lou, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 19 days.

(21) Appl. No.: 16/237,281

(22) Filed: Dec. 31, 2018

(65) Prior Publication Data

US 2020/0213591 A1 Jul. 2, 2020

(51) Int. Cl.

| | |
|---|---|
| ***H04B 1/66*** | (2006.01) |
| ***H04N 7/12*** | (2006.01) |
| ***H04N 11/02*** | (2006.01) |
| ***H04N 11/04*** | (2006.01) |
| ***H04N 19/13*** | (2014.01) |
| ***H04N 19/12*** | (2014.01) |
| ***H04N 19/186*** | (2014.01) |
| ***H04N 19/70*** | (2014.01) |
| ***H04N 19/46*** | (2014.01) |

(52) U.S. Cl.
CPC ............. *H04N 19/13* (2014.11); *H04N 19/12* (2014.11); *H04N 19/186* (2014.11); *H04N 19/46* (2014.11); *H04N 19/70* (2014.11)

(58) Field of Classification Search
CPC ............................... H04N 19/13; H04N 19/70
See application file for complete search history.

(56) References Cited

U.S. PATENT DOCUMENTS

| | | | |
|---|---|---|---|
| 7,340,103 | B2 | 3/2008 | Smirnov |
| 8,107,531 | B2 | 1/2012 | Regunathan et al. |
| 9,661,340 | B2 | 5/2017 | Sullivan et al. |
| 9,900,603 | B2 | 2/2018 | Sullivan et al. |
| 9,948,949 | B2 | 4/2018 | Rapaka et al. |
| 10,237,575 | B2 | 3/2019 | Tsai et al. |
| 2014/0301465 | A1 | 10/2014 | Kwon et al. |
| 2015/0186100 | A1 | 7/2015 | Tsai et al. |

(Continued)

OTHER PUBLICATIONS

Bross et al, "Versatile Video Coding (Draft 3)," JVET-L1001V9, Joint Video Experts Team (JVET) 12th Meeting, Maco CN, Oct. 3-12, 2018, 235 pages.

(Continued)

*Primary Examiner* — Fabio S Lima
(74) *Attorney, Agent, or Firm* — Lee & Hayes, P.C.

(57) ABSTRACT

Systems and methods are provided for improving accuracy and efficiency of a context-adaptive binary arithmetic coding (CABAC) by adaptively selecting a context model specific to the characteristics of a coding unit (CU), such as the size, dimension (height and/or width), type (luma or chroma), and/or flag type (cu_palette_flag or pred_mode_flag) of the CU, that comprise: determining a characteristic of the CU; determining whether the characteristic of the CU meets a corresponding threshold; and upon determining that the characteristic of the CU meets the corresponding threshold, selecting a first context model, or upon determining that the characteristic of the CU fails to meet the corresponding threshold, selecting a second context model.

19 Claims, 16 Drawing Sheets

(56) References Cited

U.S. PATENT DOCUMENTS

| | | | | |
|---|---|---|---|---|
| 2015/0195562 | A1 | 7/2015 | Li et al. | |
| 2015/0262404 | A1 | 9/2015 | Laude et al. | |
| 2015/0264348 | A1 | 9/2015 | Zou et al. | |
| 2015/0264361 | A1 | 9/2015 | Laude et al. | |
| 2015/0365671 | A1* | 12/2015 | Pu | H04N 19/157 375/240.03 |
| 2015/0365695 | A1* | 12/2015 | Pu | H04N 19/186 375/240.16 |
| 2015/0373325 | A1* | 12/2015 | Karczewicz | H04N 19/503 375/240.13 |
| 2016/0100171 | A1* | 4/2016 | Karczewicz | H04N 19/70 375/240.02 |
| 2016/0100179 | A1* | 4/2016 | He | H04N 19/91 375/240.25 |
| 2016/0337662 | A1 | 11/2016 | Pang et al. | |
| 2016/0345014 | A1* | 11/2016 | Kim | H04N 19/593 |
| 2017/0244966 | A1 | 8/2017 | Joshi et al. | |
| 2017/0289566 | A1 | 10/2017 | He et al. | |
| 2017/0332091 | A1* | 11/2017 | Maeda | H04N 19/146 |
| 2018/0205972 | A1* | 7/2018 | Piao | H04N 19/44 |
| 2019/0116380 | A1* | 4/2019 | Chuang | H04N 19/44 |
| 2019/0281311 | A1* | 9/2019 | Ye | H04N 19/593 |

OTHER PUBLICATIONS

Chao et al., "CE15-2: Palette mode of HEVC SCC," JVET-L0336, Joint Video Experts Team (JVET) 12th Meeting, Maco CN, Oct. 3-12, 2018, 3 pages.

Joshi et al., "High Efficiency Video Coding (HEVC) Screen Content Coding: Draft 1," in Document of Joint Collaborative Team on Video Coding, JCTVC-R1005, 18th Meeting, Sapporo, JP, Jun. 30-Jul. 9, 2014, 358 pages.

Pu et al., "Palette mode coding in HEVC Screen Content Coding Extension," IEEE Journal on Emerging and Selected Topic in Circuits and Systems, vol. 6, No. 4, Dec. 2016, pp. 420-432.

Wikipedia, "Context-adaptive binary arithmetic coding," retrieved at <<https://en.wikipedia.org/wiki/Context-adaptive_binary_arithmetic_coding>> on Oct. 4, 2019, 5 pages.

* cited by examiner

500

PALETTE INDEX MAP 506

| RUN INDEX 508 | RUN MODE 510 | PALETTE INDEX 502 | RUN OF PIXELS 512 |
|---|---|---|---|
| R0 | COPY INDEX | 1 | 4 |
| R1 | COPY INDEX | 2 | 2 |
| R2 | COPY ABOVE | N/A | 10 |

PARAMETER TABLE 504

CONTEXT MODEL SELECTION BASED ON CODING UNIT CHARACTERISTICS

BACKGROUND

The state-of-the-art video coding standard, such as H.264/AVC (Advanced Video Coding), H.264/MPEG-4 AVC, and H.265/HEVC (High Efficiency Video Coding) standard, is based on a hybrid coding scheme using block-based prediction and transform coding.

To compress a video frame, a video compression system applies prediction methods, such as intra-prediction or inter-prediction, to derive a prediction frame. Based on the prediction frame, the video compression system further encodes residual information to refine the prediction frame. The residual information is usually compressed by transform and quantization techniques. Based on those information, a decoder is able to reconstruct the video frame from the prediction frame and the residual information.

Context-adaptive binary arithmetic coding (CABAC) is a lossless compression technique used in the H.264/MPEG-4 AVC and the H.265/HEVC standards, and it provides improved compression than most other entropy encoding algorithms used in video encoding. However, because the CABAC requires a larger amount of processing to decode compared to a simpler scheme, such as context-adaptive variable-length coding (CAVLC) used in the standard's Baseline profile, the CABAC is only supported in the Main and higher profiles of the standard.

In a CABAC engine, if the system were able to identify that the statistic of a bin to be encoded is different in a different condition, the system would be able to design different context models and adaptively select the corresponding context models according to the condition. Because the context models are more accurate, the coding efficiency is improved. However, for the palette mode, lager CUs tend to use the palette mode more than the smaller CUs, and for the current picture referencing (CPR), the smaller CUs tend to use the palette mode more than the larger CUs. Further, the statistic of both tools, the palette mode and the CPR, may vary between a luma CU and a chroma CU when dual tree is turned on in the versatile video coding (VVC)/H.266.

In the palette mode signaling, a palette mode flag, such as cu_palette_flag, is signaled in each CU to indicate whether the CU is coded by palette mode, and a shared context model of the cu_palette_flag is utilized for all sizes of the CU and for both luma and chroma CUs. In the CPR signaling, a prediction mode flag, such as pred_mode_flag, is signaled in each CU to indicate whether the CU is coded by an inter/intra mode, and a shared context model of the pred_mode_flag is utilized for all sizes of the CU and for both luma and chroma CUs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to improving context models, and more specifically to improving coding efficiency and accuracy by selectively utilizing different context models based on the signaling, i.e., the palette mode or the current picture referencing (CPR), a size of a coding unit (CU), and a type of the CU, i.e., a luma CU or a chroma CU.

Figure 1:
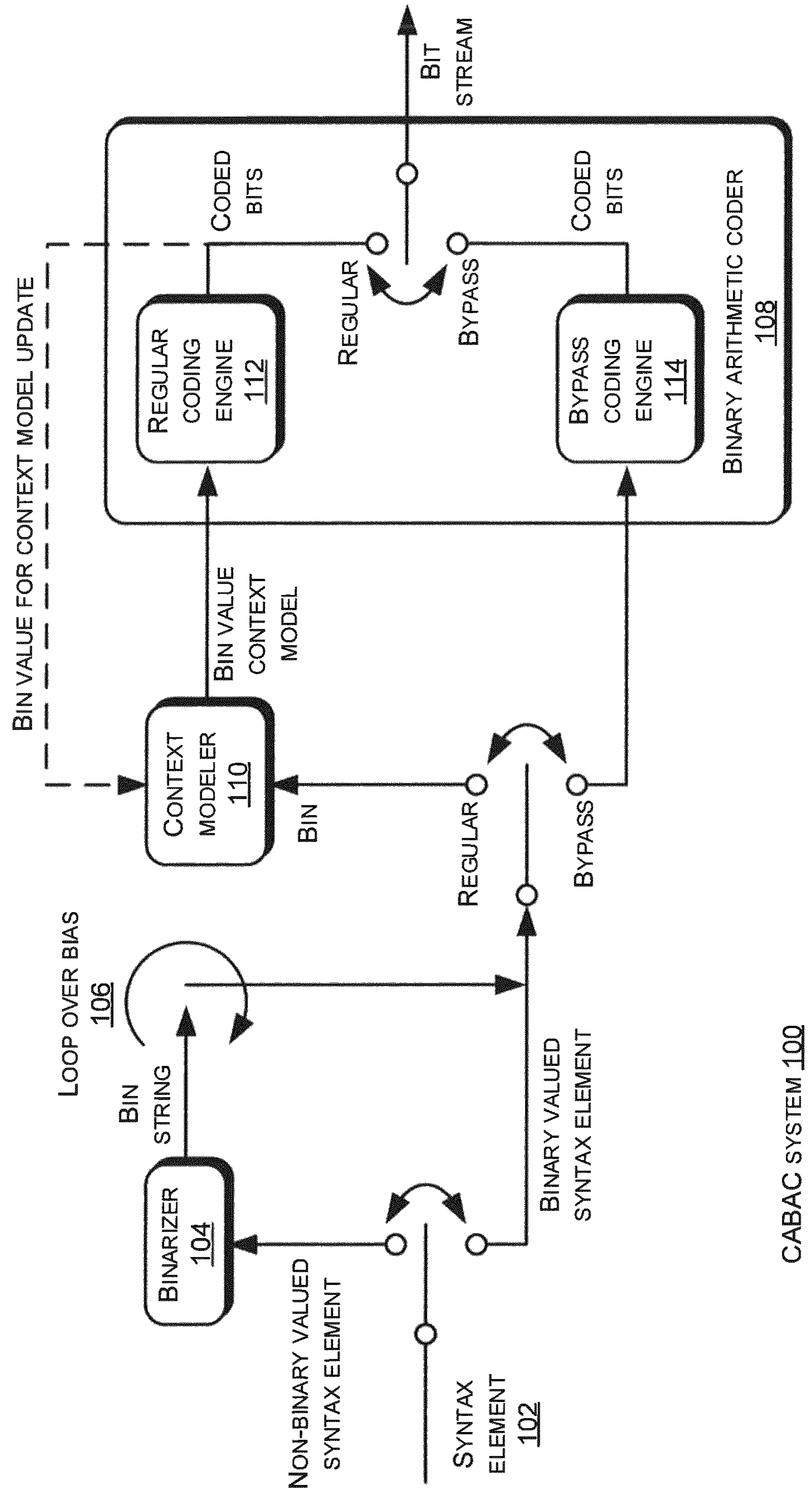
FIG. 1 illustrates an example video process of the context-adaptive binary arithmetic coding (CABAC) system.

FIG. 1 illustrates an example video process of the context-adaptive binary arithmetic coding (CABAC) system 100.

The CABAC is based on an arithmetic coding, with modifications to adapt it to the needs of video encoding standards. For example, the CABAC may encode binary symbols, which may keep the complexity low and allow probability modelling for more frequently used bits of any symbol; the CABAC may use a multiplication-free range division by the use of quantized probability ranges and probability states; and the probability models may be selected adaptively based on a local context, allowing better modelling of probabilities because coding modes are usually well correlated locally.

The CABAC may have multiple probability modes for different contexts and may first convert all non-binary symbols to binary, and then for each bit, the coder may select which probability model to use and use information from nearby elements to optimize the probability estimate. Arithmetic coding may then be applied to compress the data.

The context modeling may provide estimates of conditional probabilities of the coding symbols. By utilizing suitable context models, a given inter-symbol redundancy may be exploited by switching between different probability models according to already-coded symbols in the neighborhood of the current symbol to encode. The context modeling may be responsible for most of the CABAC's roughly 10% savings in bit rate over the CAVLC entropy coding method.

In the CABAC system 100, only binary decisions (1 or 0) may be encoded. If a syntax element 102 were a non-binary valued symbol, such as a transform coefficient or a motion vector, the syntax element 102 might be "binarized" or converted into a binary code by a binarizer 104 and a loop over bias 106. The binarizer 104 may binarize the syntax element 102 into a binarized symbol, and each bit, or bin, of the binarized symbol from the binarizer 104 may be fed to the loop over bias 106 prior to arithmetic coding. This process may be similar to a process of converting a data symbol into a variable length code, but the binary code may be further encoded by a binary arithmetic code 108 prior to transmission.

A context model, which may be a probability model for one or more bins of the binarized symbol, may be selected by a context modeler 110. The context model may be selected based on statistics of recently coded symbols and may store the probability of each bin being 1 or 0. The binary arithmetic coder 108 may encode each bin according to the selected probability model using a regular coding engine 112. If the syntax element 102 were a binary valued symbol, then the binarization and the context model selection stages described above are bypassed, and each bit of the syntax element 102 may be encoded by a bypass coding engine 114. The selected context model may be updated based on the actual coded value, for example, if the bin value were "1", the frequency count of "1" may be increased. The coded bits may then be transmitted in a bit stream.

Figure 2:
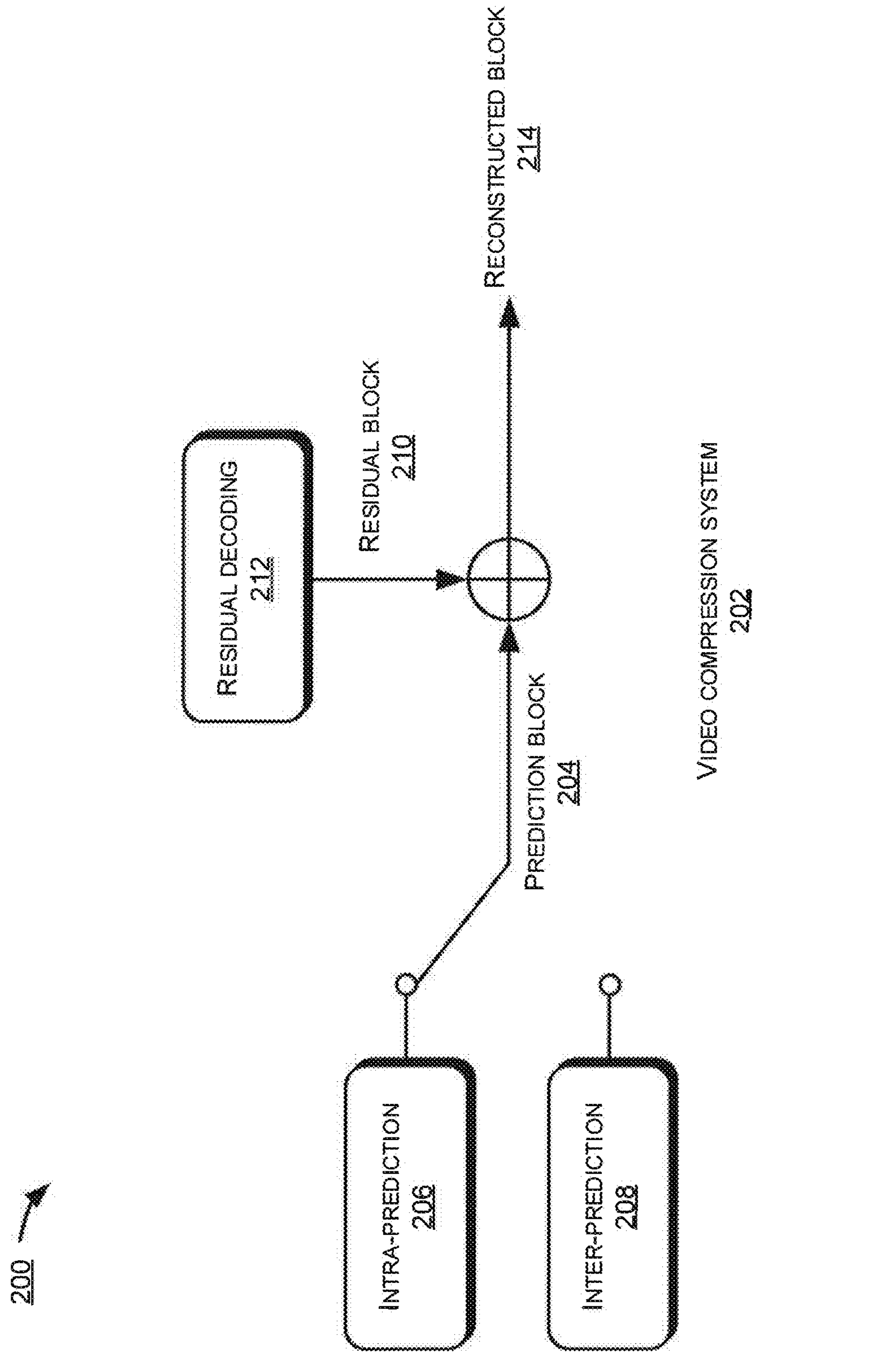
FIG. 2 illustrates an example decoding process of a video compression system using prediction methods.

FIG. 2 illustrates an example decoding process 200 of a video compression system 202 using prediction methods.

The video compression system 202 first derives a prediction block 204 by applying a prediction method, such as intra-prediction 206 or inter-prediction 208, and then decodes a residual block 210 by applying a residual decoding method 212. The video compression system 202 combines the prediction block 204 and the residual block 210 to generate a reconstructed block 214. Corresponding pixel values of the prediction block 204 and the residual block 210 are simply added to generate corresponding pixel values of the reconstructed block 214.

Figure 3:
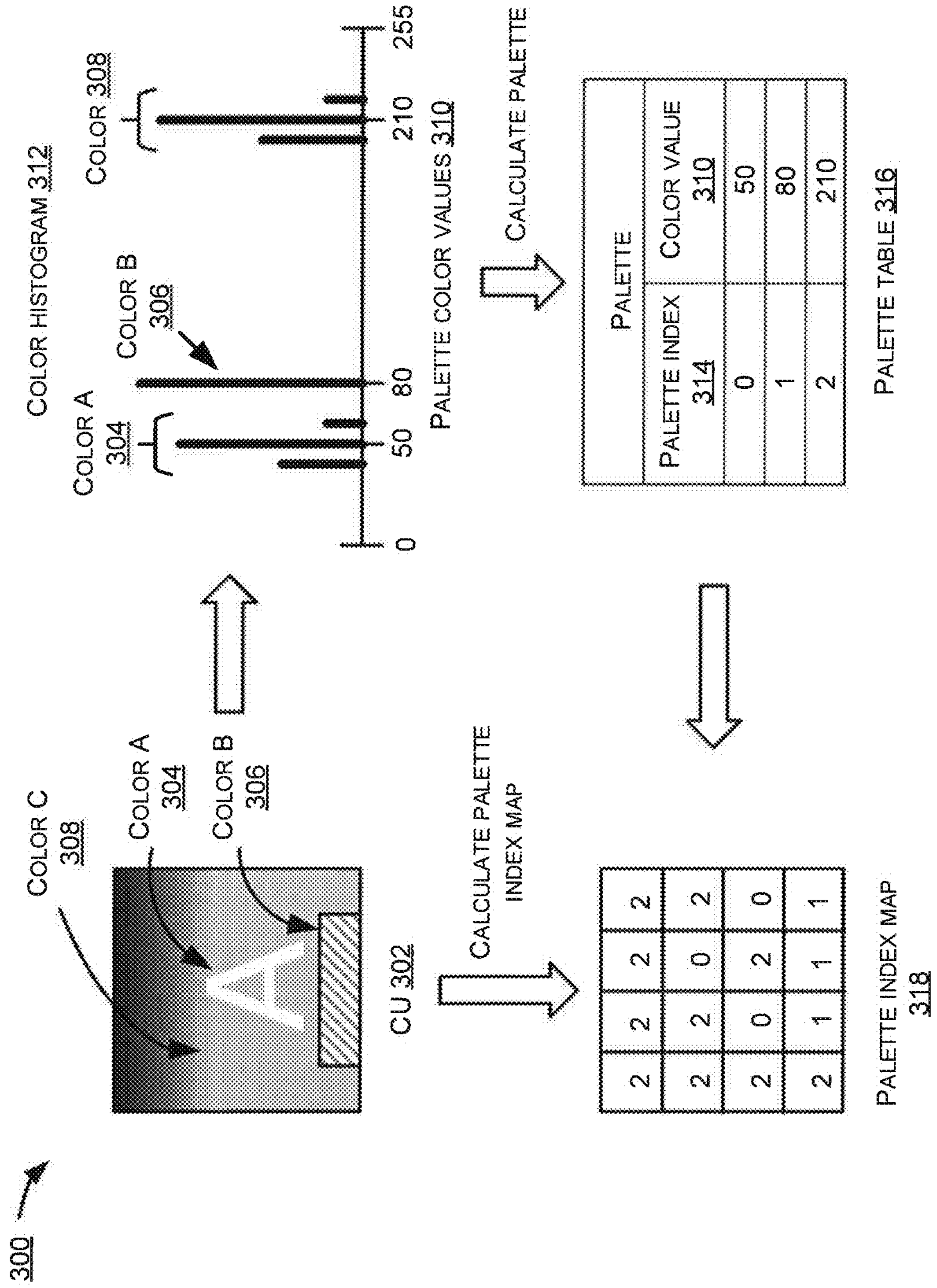
FIG. 3 illustrates an example diagram of the palette mode applied to an image.

FIG. 3 illustrates an example diagram 300 of the palette mode applied to CU 302. For simplicity, a pixel or a palette index is shown to correspond to only one value. However, in HEVC SCC, a pixel or a palette index may represent three color component values, such as YCbCr or GBR.

In the HEVC SCC palette mode, a flag is transmitted for each CU to indicate whether the palette mode is used for that CU, such as a CU 302. If the palette mode is used for the CU 302, the pixels, having pixel values close to palette colors, such as color A 304, color B 306, and color C 308, are represented by the palette color values 310 as shown in a color histogram 312. For example, the color A 304 is shown to be close to the palette color value of 50, the color B 306 is shown to be close to the palette color value of 80, and the color C 308 is shown to be close to the palette color value of 310. The palette color values 310 of the CU 302 are denoted by palette indices 314, where the palette color values 310 are representative colors of the CU 302 as shown in a palette table 316. The remaining pixels are presented by a special palette index value, denoted as an escape index, and their pixel values are signaled directly. Note that a color is a 3-value, for example, YCbCr or GBR, vector. Palette indices of all pixels in the CU 302 form a palette index map 318.

Figure 4:
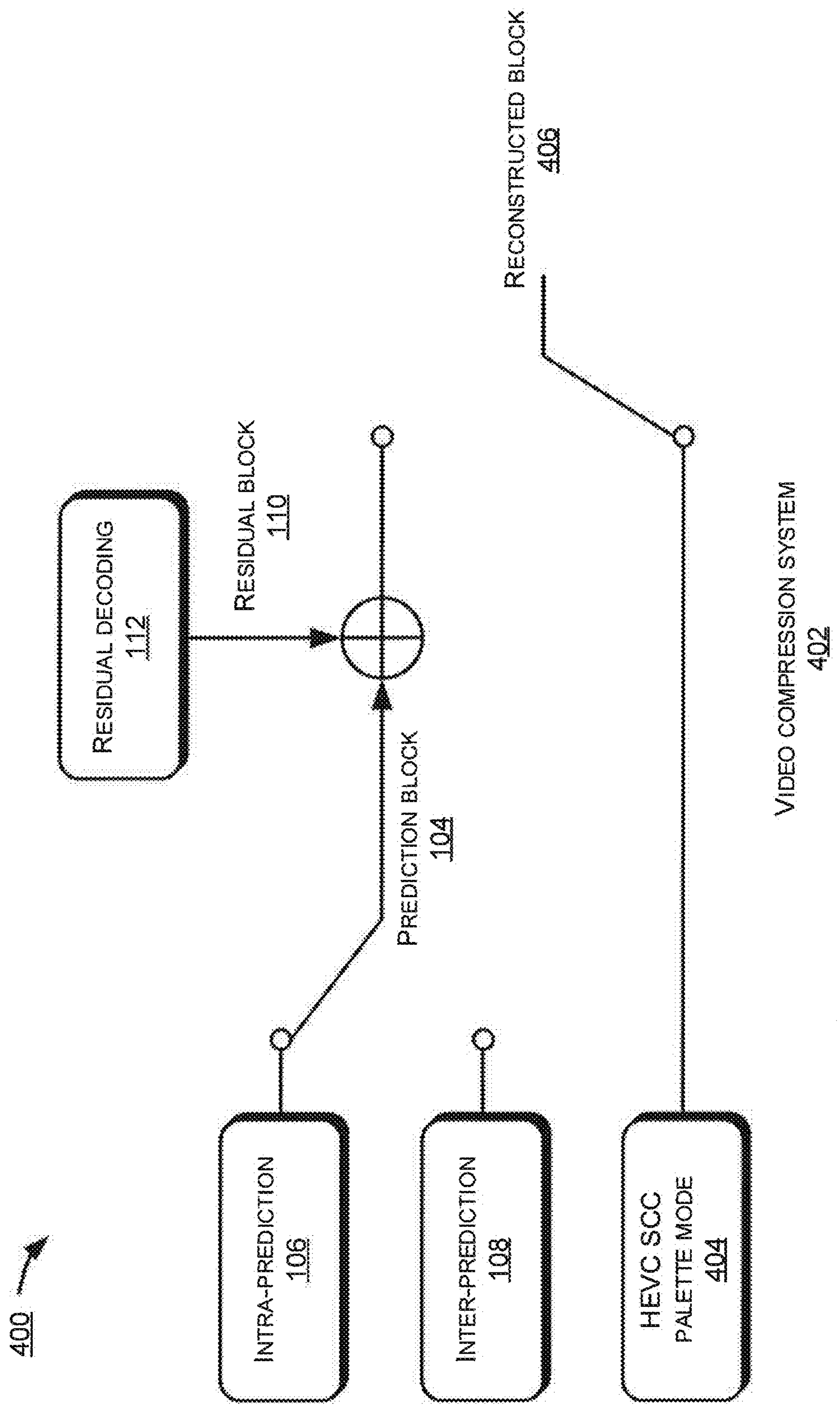
FIG. 4 illustrates an example decoding process of the video compression system using HEVC SCC palette mode.

FIG. 4 illustrates an example decoding process 400 of the video compression system 402 using HEVC SCC palette mode.

Compared to the intra/inter-prediction methods described with reference to FIG. 2, if a block, or a CU, is encoded by the HEVC SCC palette mode 404, it is decoded independently to generate a reconstructed block 406 without using any prediction method or residual refinement. To decode a palette encoded block, a video decoder of the video compression system 402 decodes palette colors and indices. Palette colors are described by a palette table, such as the palette table 316, and encoded by palette table coding tools. Based on the palette table, a pixel of three color components is represented by a palette index, such as the palette index 314. Palette indices of all pixels in the CU form a palette index map, such as the palette index map 318, and are encoded by palette index map coding tools.

Figure 5:
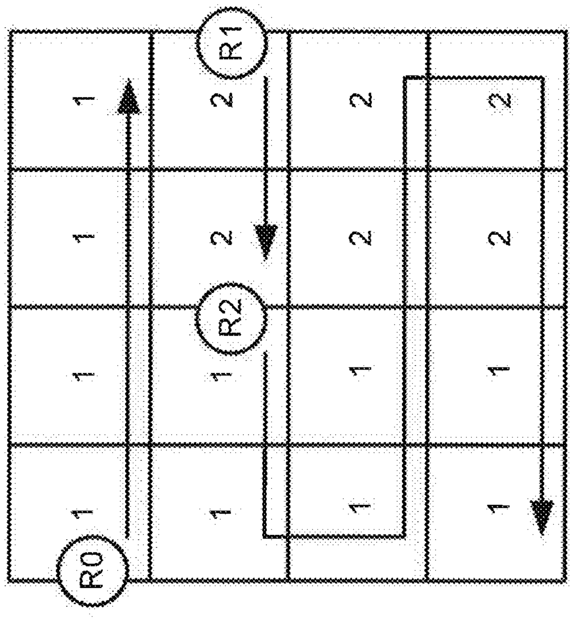
FIG. 5 illustrates an example palette index mapping using the HEVC SCC palette mode.

FIG. 5 illustrates an example the palette index map coding 500.

The video compression system 402 constructs a palette table predictor to predict a palette table, such as the palette table 316, of the current CU by applying predictive coding where the palette of the last palette coded CU is used as the predictor. After the palette table is encoded, the pixels in the current CU are represented by palette indices 502 corresponding to the colors in the palette as shown in a parameter table 504 along with other parameters of the palette index map coding. The indices form a palette index map 506 which is divided into several runs and then encoded in horizontal or vertical traverse scan order. In this example, the horizontal scan order is assumed, and the direction of the scan is shown as arrows in the palette index map 506. In the palette index map 506, 16 indices are encoded by run indices 508, three runs R0, R1, and R2, with horizontal traverse scan. There are two run modes 510, copy index mode and copy above mode, and for each starting position of a run, a flag is transmitted to indicate which run mode is used.

If the copy above mode is used, a run of pixels 512 will copy the palette indices from their above pixels. In this example, a run, R2, is a copy above run with a run value of 10. If the copy index mode is used, a palette_index_idc syntax element is first signaled, followed by a piece of PaletteIndexRun information. The palette_index_idc syntax describes whether the run is copy index mode (palette_index_idc=0) or copy above mode (palette_index_idc=1), and the PaletteIndexRun syntax describes the length of the run. A run of pixels 512 shares the same palette index 502, where the palette index 402 and the run value of the run of pixels 412 are derived from the palette_index_idc and PaletteIndexRun, respectively.

Figure 6:
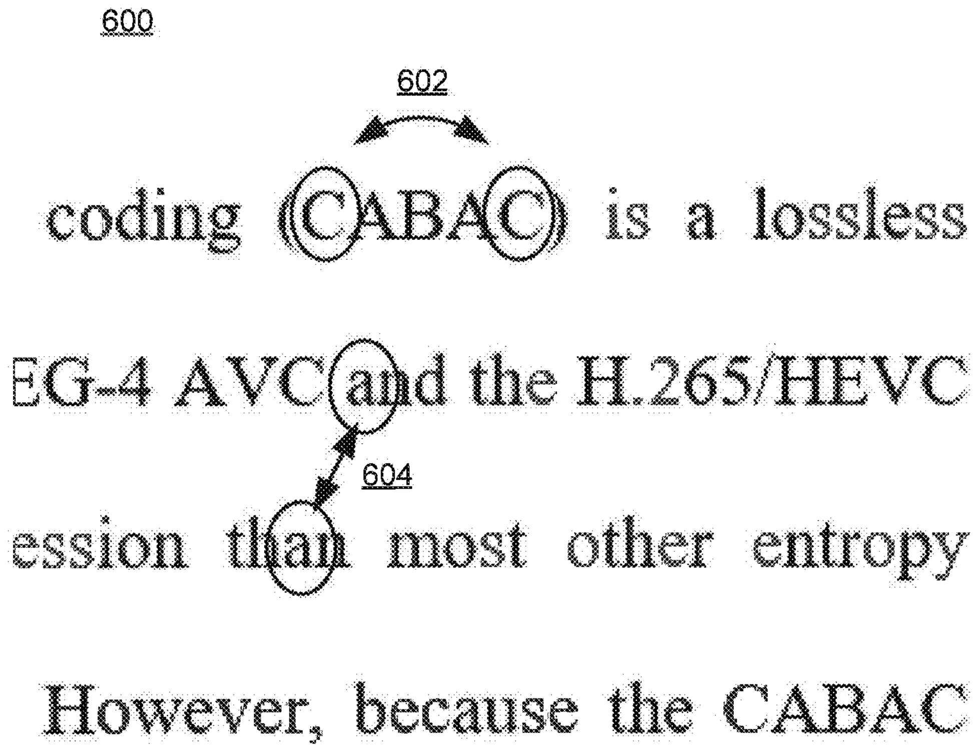
FIG. 6 illustrates an example graphical representation of a current picture referencing (CPR).

FIG. 6 illustrates an example graphical representation 600 of a current picture referencing (CPR).

For a typical screen content, repetitive patterns may be found within the same picture as illustrated in FIG. 6. A new prediction mode, a current picture referencing (CPR), which may also be referred to as an intra block copy (IBC) mode, may utilize this characteristic. In the IBC mode, a prediction unit (PU) may be predicted from a previously reconstructed block within the same picture. Similar to a PU in motion compensation, a displacement vector, called a block vector or a BV, may be used to signal the relative displacement from the position of the current PU to that of the reference block. The prediction errors after the IBC compensation may then be coded using transformation, quantization and entropy coding. Because the IBC mode and the HEVC inter mode share many similarities, the block level IBC operations and HEVC inter mode the HEVC SCC are unified, specifically, the current (partially decoded) picture may be treated as a reference picture for decoding the current slice (602 and 604).

The CPR, or the IBC, has been shown to be efficient when coding screen content video materials. In the VVC/H.266, the CPR mode is coded in the same way as the regular inter mode. For each block, the use of the CPR mode may be signaled by using a reference picture index pointing to the current picture itself. The current (partially) decoded picture may be considered as a reference picture. This current picture may be put in the last position of a reference picture list 0. Therefore, for a slice using the current picture as the only reference picture, its slice type may be considered as a P slice (predicted picture). The bitstream syntax in this approach may follow the same syntax structure for the inter coding while the decoding process may be unified with the inter coding. The difference may be that the block vector (which is the motion vector pointing to the current picture) always uses an integer-pel resolution. For example, in an encoder search for this mode, both block width and height are smaller than or equal to 16; a chroma interpolation is enabled when a luma block vector is an odd integer number; and an adaptive motion vector resolution (AMVR) for the CPR mode is enabled when the sequence parameter set (SPS) flag is on. In this case, when the AMVR is used, a block vector may be switched between 1-pel integer and 4-pel integer resolution at a block level.

In the HEVC, a coding tree unit (CTU) may be split into CUs by using a quaternary-tree structure denoted as coding tree to adapt to various local characteristics. The decision whether to code a picture area using an inter-picture (temporal) or an intra-picture (spatial) prediction may be made at a leaf CU level. Each leaf CU may be further split into one, two or four PUs according to the PU splitting type. Inside one PU, the same prediction process may be applied, and relevant information may be transmitted to the decoder on a PU basis. After obtaining the residual block by applying the prediction process based on the PU splitting type, a leaf CU may be partitioned into transform units (TUs) according to another quaternary-tree structure similar to the coding tree for the CU.

Figure 7:
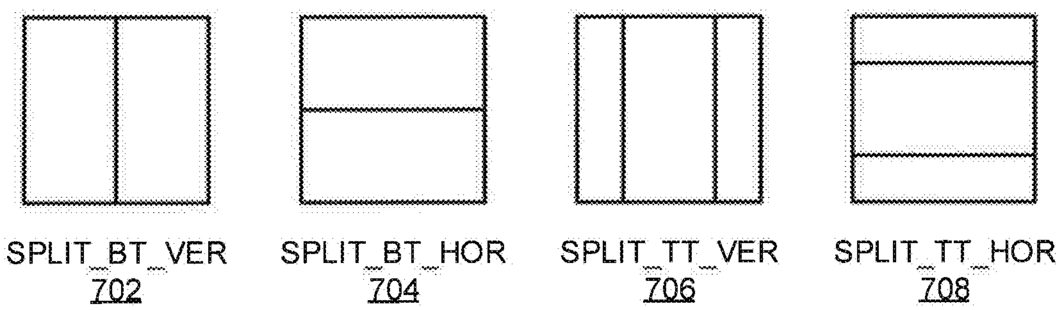
FIG. 7 illustrates four example splitting types in the multi-type tree structure.

In the VVC, a quadtree with nested multi-type tree using binary and ternary splits segmentation structure may replace the concepts of multiple partition unit types. That is, the separation of the CU, PU and TU concepts may be removed except as needed for CUs having a size too large for the maximum transform length, and more flexibility for CU partition shapes may be supported. In the coding tree structure, a CU may be either a square or rectangular in shape. A CTU may be first partitioned by a quaternary tree (a.k.a. quadtree) structure. Then the quaternary tree leaf nodes may be further partitioned by a multi-type tree structure. FIG. 7 illustrates four example splitting types in the multi-type tree structure, vertical binary splitting (SPLIT_BT_VER) 702, horizontal binary splitting (SPLIT_BT_HOR) 704, vertical ternary splitting (SPLIT_TT_VER) 706, and horizontal ternary splitting (SPLIT_TT_HOR) 708. The multi-type tree leaf nodes may be called coding units (CUs), and unless the CU is too large for the maximum transform length, this segmentation may be used for prediction and transform processing without any further partitioning. In most cases, therefore, the CU, PU and TU may have the same block size in the quadtree with nested multi-type tree coding block structure. The block sizes may be different when maximum supported transform length is smaller than the width or height of the color component of the CU.

Figure 8:
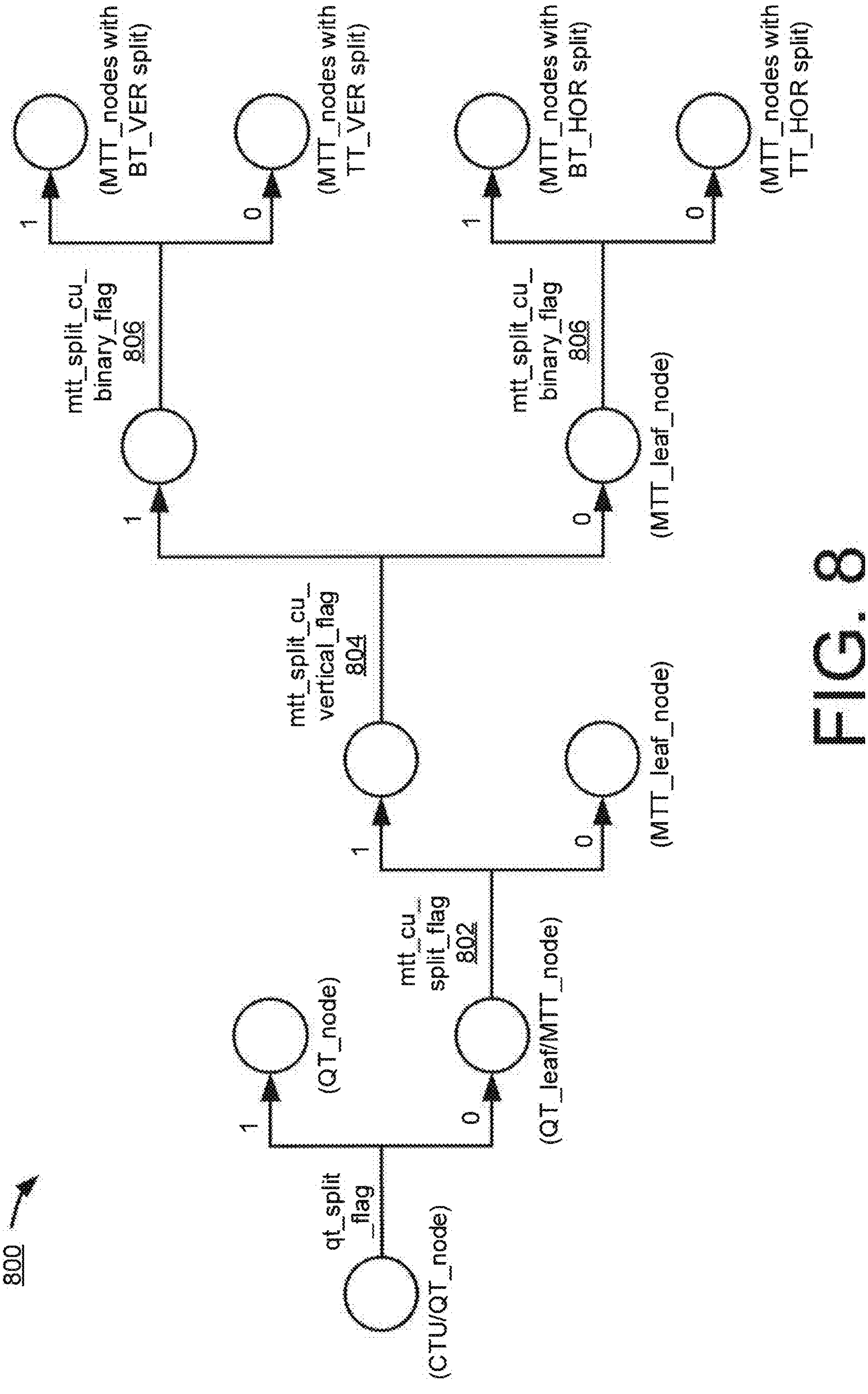
FIG. 8 illustrates a signaling mechanism of the partition splitting information in a quadtree with a nested multi-type tree coding tree structure.

FIG. 8 illustrates a signaling mechanism 800 of the partition splitting information in a quadtree with a nested multi-type tree coding tree structure. A CTU may be treated as a root of a quaternary tree and may be first partitioned by a quaternary tree structure. Each quaternary tree leaf node (when sufficiently large to allow it) may then be further partitioned by a multi-type tree structure. In the multi-type tree structure, a first flag (mtt_split_cu_flag 802) may be signaled to indicate whether the node is further partitioned; when a node is further partitioned, a second flag (mtt_split_cu_vertical_flag 804) may be signaled to indicate the splitting direction, and then a third flag (mtt_split_cu_binary_flag 806) may be signaled to indicate whether the split is a binary split or a ternary split. Table 1 illustrates the multi-type tree slitting mode (MttSplitMode) of a CU derived based on the values of the mtt_split_cu_vertical_flag 804 and the mtt_split_cu_binary_flag 806.

TABLE 1

MttSplitMode derivation based on multi-type tree syntax elements.

| MttSplitMode | mtt_split_cu_vertical_flag | mtt_split_cu_binary_flag |
|---|---|---|
| SPLIT_TT_HOR | 0 | 0 |
| SPLIT_BT_HOR | 0 | 1 |
| SPLIT_TT_VER | 1 | 0 |
| SPLIT_BT_VER | 1 | 1 |

Figure 9:
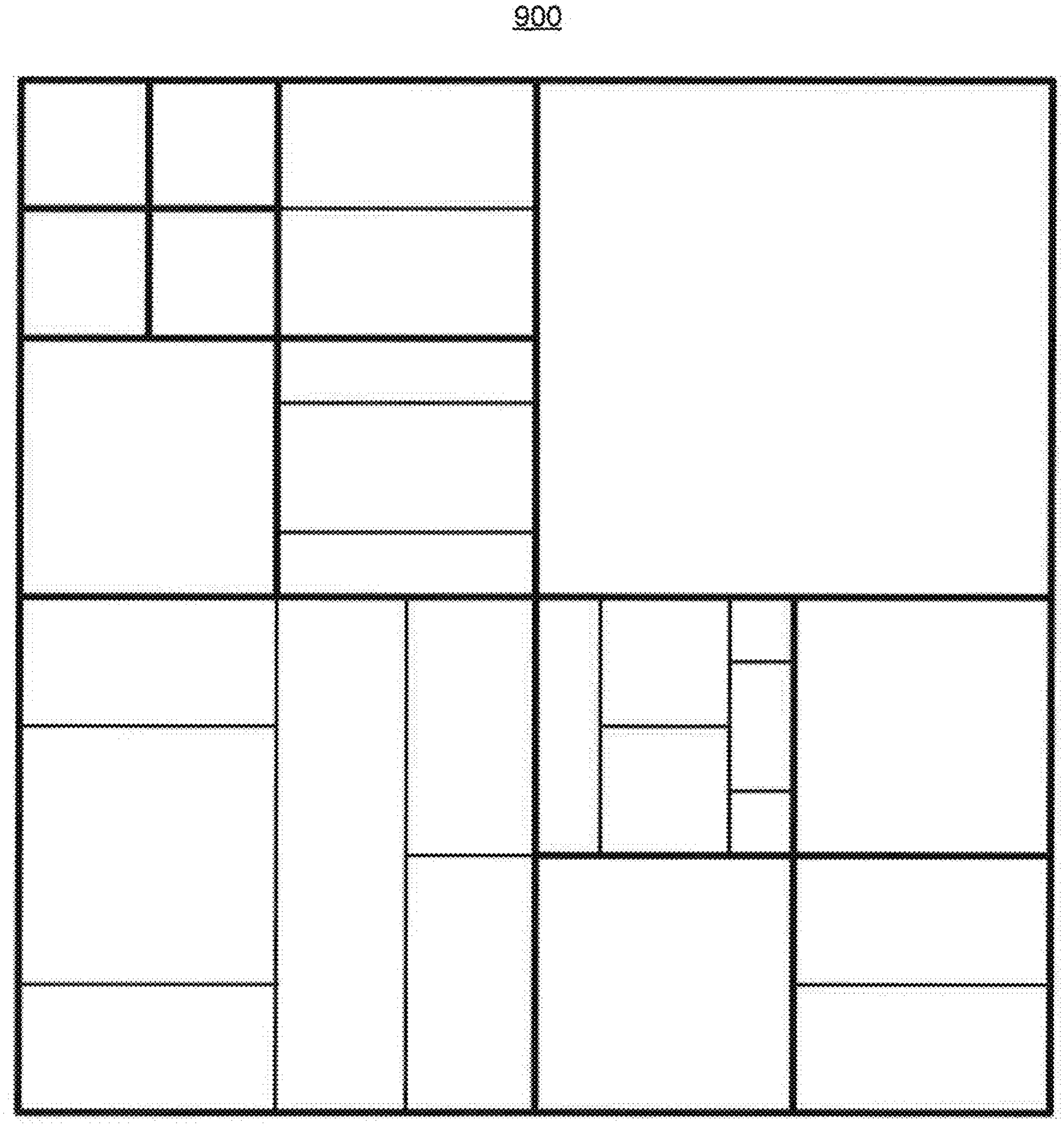
FIG. 9 illustrates a CTU divided into multiple CUs with a quadtree and nested multi-type tree coding block structure.

FIG. 9 illustrates a CTU 900 divided into multiple CUs with a quadtree and a nested multi-type tree coding block structure, where the bold block edges represent the quadtree partitioning and the remaining edges represent multi-type tree partitioning. The quadtree with the nested multi-type tree partition may provide a content-adaptive coding tree structure comprised of CUs. The size of the CU may be as large as the CTU or as small as 4×4 in units of luma samples. For the case of the 4:2:0 chroma format, the maximum chroma CB size is 64×64 and the minimum chroma CB size is 2×2.

In the VVC, the maximum supported luma transform size is 64×64 and the maximum supported chroma transform size is 32×32. When the width or height of the CB is larger the maximum transform width or height, the CB may be automatically split in the horizontal and/or vertical direction to meet the transform size restriction in that direction.

The following parameters may be defined and specified by the SPS syntax elements for the quadtree with a nested multi-type tree coding tree scheme.

CTU size: the root node size of a quaternary tree.

MinQTSize: the minimum allowed quaternary tree leaf node size.

MaxBtSize: the maximum allowed binary tree root node size.

McvcTtSize: the maximum allowed ternary tree root node size.

MaxMttDepth: the maximum allowed hierarchy depth of multi-type tree splitting from a quadtree leaf.

MinBtSize: the minimum allowed binary tree leaf node size.

MinTtSize: the minimum allowed ternary tree leaf node size.

In one example of the quadtree with a nested multi-type tree coding tree structure, the CTU size may be set as 128×128 luma samples with two corresponding 64×64 blocks of 4:2:0 chroma samples, the MinQTSize may be set as 16×16, the MaxBtSize as 128×128, and MaxTtSize as 64×64, the MinBtSize and MinTtSize (for both width and height) may be set as 4×4, and the MaxMttDepth may be set as 4. The quaternary tree partitioning may be applied to the CTU first to generate quaternary tree leaf nodes. The quaternary tree leaf nodes may have a size from 16×16 (i.e., the MinQTSize) to 128×128 (i.e., the CTU size). If the leaf QT node were 128×128, it would not be further split by the binary tree because the size exceeds the MaxBtSize and MaxTtSize (i.e., 64×64). Otherwise, the leaf quadtree node could be further partitioned by the multi-type tree. Therefore, the quaternary tree leaf node may also be the root node for the multi-type tree and it may have a multi-type tree depth (mttDepth) as 0. When the multi-type tree depth reaches MaxMttDepth (i.e., 4), no further splitting may be considered. When the multi-type tree node has width equal to MinBtSize and smaller or equal to 2×MinTtSize, no further horizontal splitting may be considered. Similarly, when the multi-type tree node has a height equal to MinBtSize and smaller or equal to 2×MinTtSize, no further vertical splitting may be considered.

Figure 10:
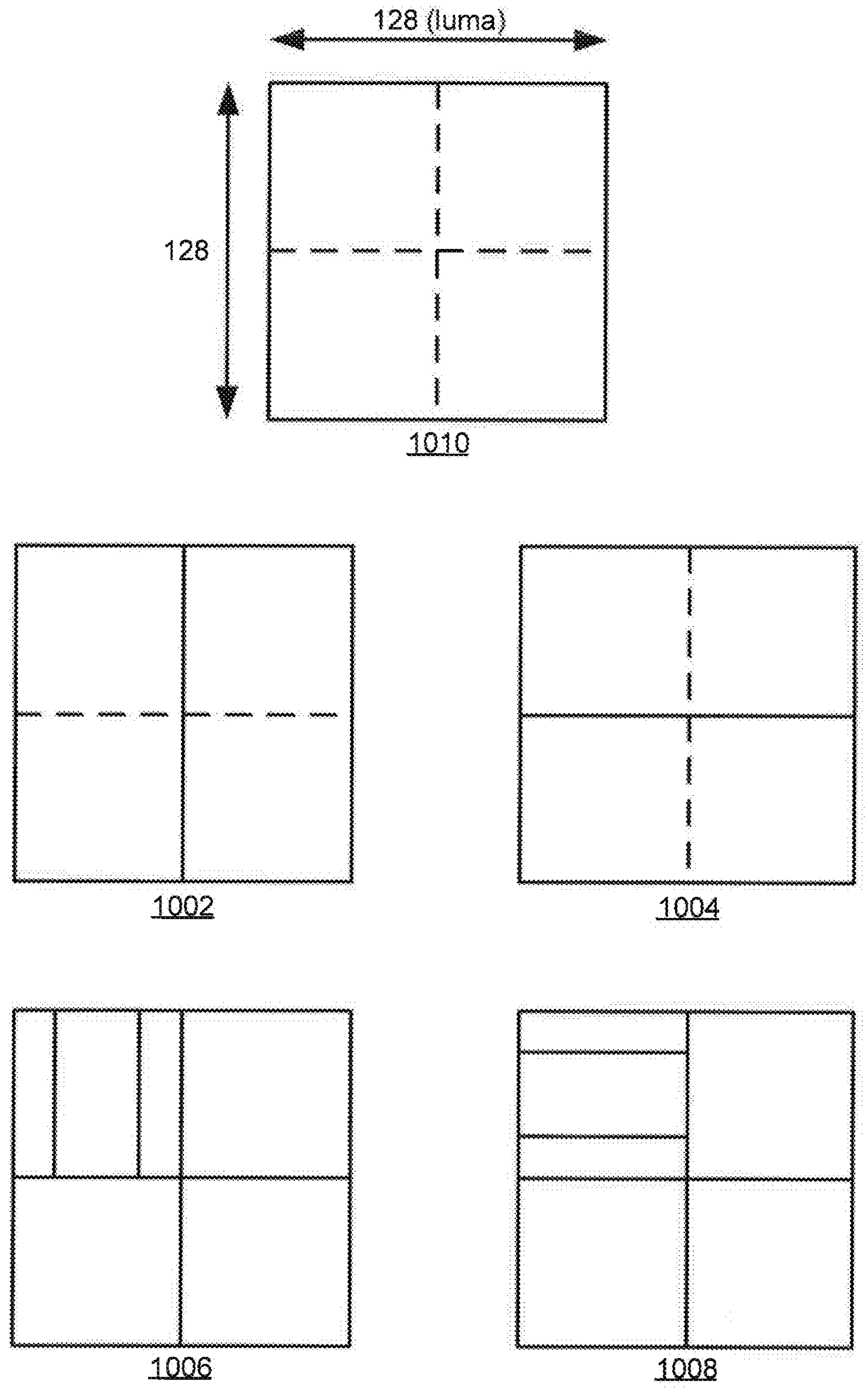
FIG. 10 illustrates example non-TT splits for a 128×128 luma block.

FIG. 10 illustrates example non-TT splits 1002, 1004, 1006, and 1008 for a 128×128 luma block 1010. To allow a 64×64 luma block and a 32×32 chroma pipelining design in the VVC hardware decoders, the TT split may be forbidden when either the width or the height of a luma coding block is larger than 64, as illustrated in FIG. 10. The TT split may also be forbidden when either the width or the height of a chroma coding block is larger than 32.

In the VVC, the coding tree scheme may support the ability for the luma and chroma to have a separate block tree structure. For P and B slices, the luma and chroma CTBs in one CTU may have to share the same coding tree structure. However, for I slices, the luma and chroma may have separate block tree structures. When separate block tree mode is applied, luma CTB may partitioned into CUs by one coding tree structure, and the chroma CTBs may be partitioned into chroma CUs by another coding tree structure. Thus, a CU in an I slice may consist of a coding block of the luma component or coding blocks of two chroma components, and a CU in a P or B slice may always consist of coding blocks of all three color components unless the video is monochrome.

In a CABAC engine, if the system were able to identify that the statistic of a bin to be encoded is different in a different condition, the system would be able to design different context models and adaptively select the corresponding context models according to the condition. In the palette mode signaling, a palette mode flag, such as cu_palette_flag, is signaled in each CU to indicate whether the CU is coded by palette mode, and in the CPR signaling, a prediction mode flag, such as pred_mode_flag, is signaled in each CU to indicate whether the CU is coded by inter/intra mode. However, respective context models for the cu_palette_flag and the pred_mode_flag do not depend on the size of the CU or the type, luma or chroma, of the CU. In other words, a same, or shared, context model is used regardless of the size and the type of the CU for the cu_palette_flag, and another shared context model is used regardless of the size and the type of the CU for the pred_mode_flag. Therefore, accuracy and efficiency of the CABAC may be improved by adaptively selecting a context model specific to the characteristics of a CU, such as the size, dimension (height and/or width), type (luma or chroma), and/or flag type (cu_palette_flag or pred_mode_flag) of the CU.

Figure 11:
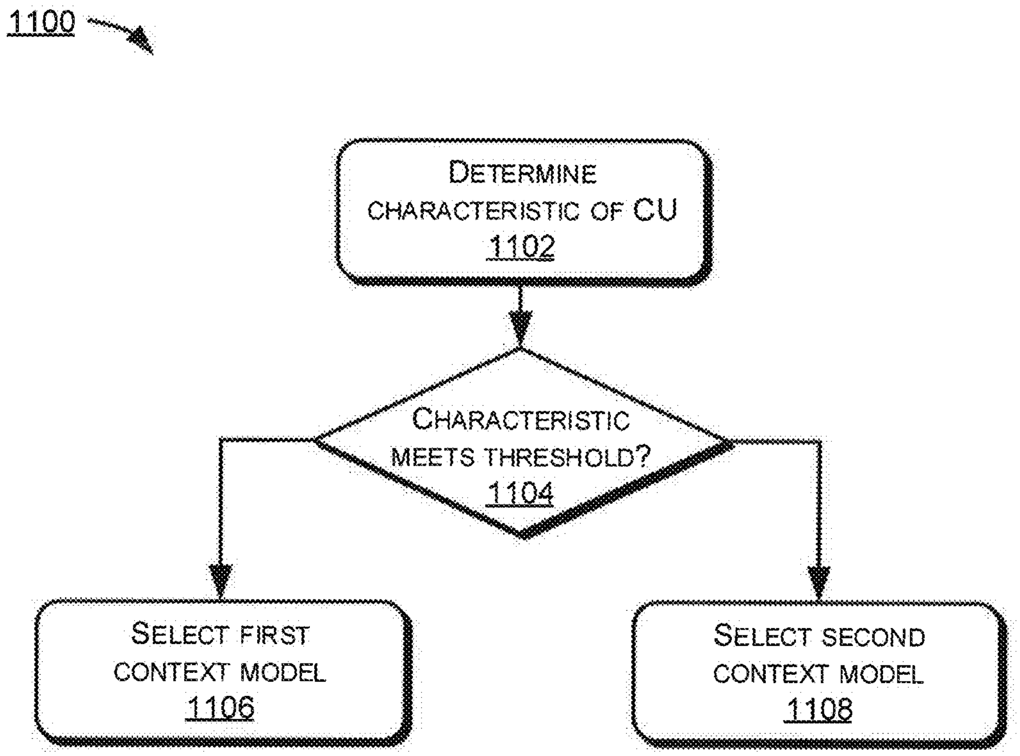
FIG. 11 illustrates an example process for adaptively selecting a context model based on the characteristics of a CU.

FIG. 11 illustrates an example process 1100 for adaptively selecting a context model based on the characteristics of a CU.

By adaptively selecting a context model based on the characteristics of a CU, accuracy and efficiency of a coding method for the CU may be improved. Instead of utilizing one common context model for the CU regardless of the size of the CU, the coding mode of the CU, and the type of the CU, an appropriate context model may be selected based on the characteristics of the CU, such as the height, width, and area of the CU, the coding mode (the palette or prediction mode), and the type (luma or chroma).

At block 1102, a characteristic of a CU, such as a size of the CU, may be determined and whether the characteristic of the CU meets a corresponding threshold may be determined at block 1104. Upon determining that the characteristic of the CU meets the corresponding threshold at block 1104, a first context model may be selected at block 1106. If the characteristic of the CU is determined not to meet the corresponding threshold at block 1104, then a second context model may be selected at block 1108.

Determining whether the characteristic of the CU meets the corresponding threshold at block 1104 may include determining whether the size of the CU is larger than or equal to the predefined CU size. The size of the CU and the predefined CU size may include a height, a width, and an area of the CU. For example, if the size of the CU were 64 (length)×32 (width), and the threshold, the predefined CU size, were 64 in length, then the characteristic (length) of the CU would meet the threshold because the length of the CU is equal to the threshold of the predefined CU size, which is 64 in length, and the first context model would be selected. For the same CU, if the threshold were the predefined CU width of 64, then the CU would fail to meet the threshold because the width of the CU, being 34, is not greater than or equal to the threshold of the predefined CU size, which is 64, and the second context model would be selected. The characteristic of the CU may be signaled in a header of one of syntax elements, such as sequences header, picture header, or slice header.

Alternatively, or additionally, if the characteristic of the CU is determined to be a signaling flag associated with the CU at block 1102, determining whether the characteristic of the CU meets the corresponding threshold at block 1104 may include determining that the characteristic of the CU meets the corresponding threshold if the signaling flag associated with the CU is a palette flag, and determining that the characteristic of the CU fails to meet the corresponding threshold if the signaling flag associated with the CU is a prediction flag.

Alternatively, or additionally, if the characteristic of the CU is determined to be a type of the CU at block 1102, determining whether the characteristic of the CU meets the corresponding threshold at block 1104 may include determining that the characteristic of the CU meets the corresponding threshold if the type of the CU is a luma CU, and determining that the characteristic of the CU fails to meet the corresponding threshold if the type of the CU is a chroma CU.

Figure 12:
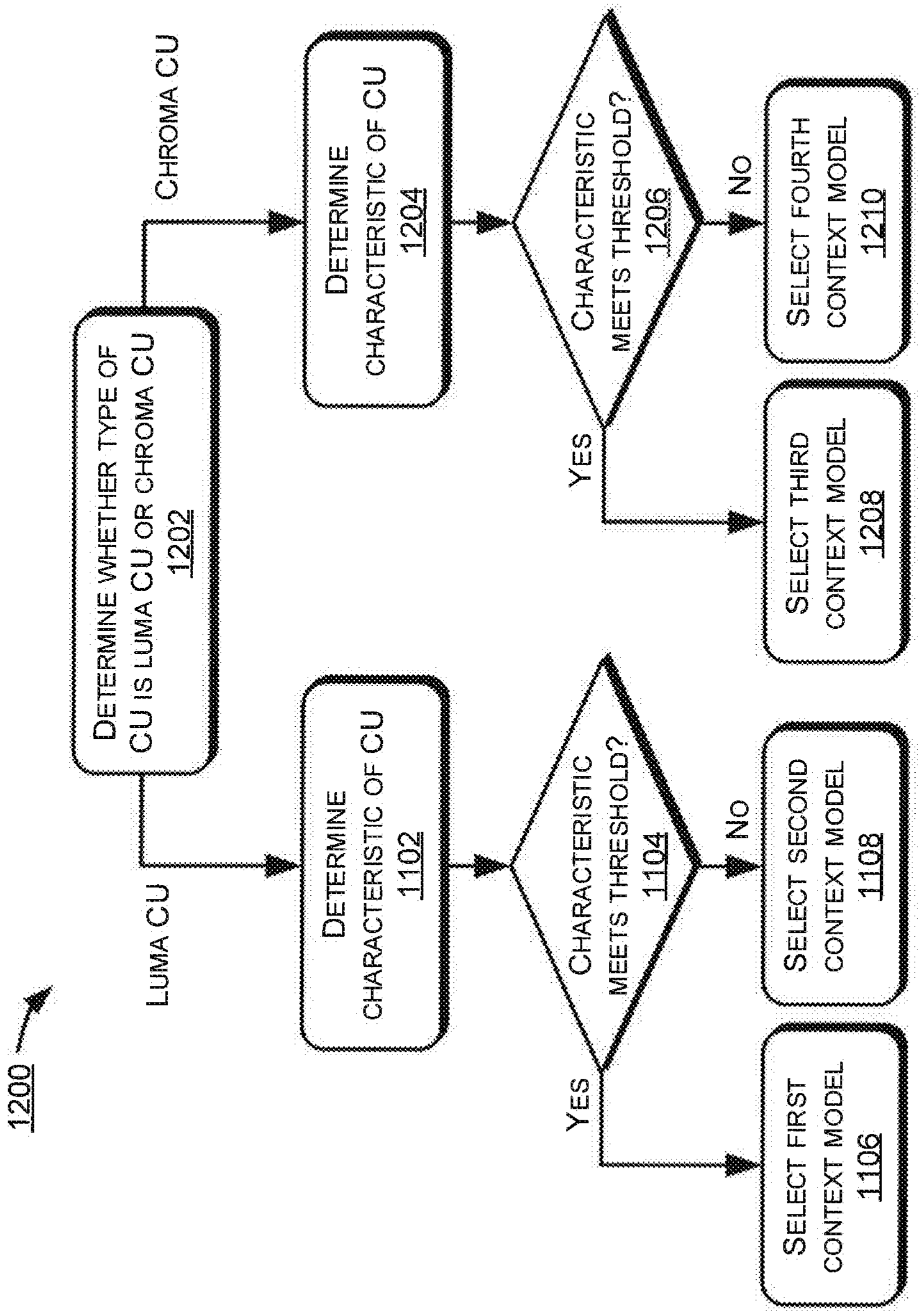
FIG. 12 illustrates an example process prior to the process illustrated in FIG. 11.

FIG. 12 illustrates an example process 1200 prior to the process illustrated in FIG. 11.

Prior to determining the characteristic of the CU, whether a type of the CU is a luma CU or chroma CU may be determined at block 1202. Each type may then proceed to the process described in FIG. 11. For the chroma CU, the blocks corresponding to those in FIG. 11 are re-numbered as 1204, 1206, 1208, and 1210.

Figure 13:
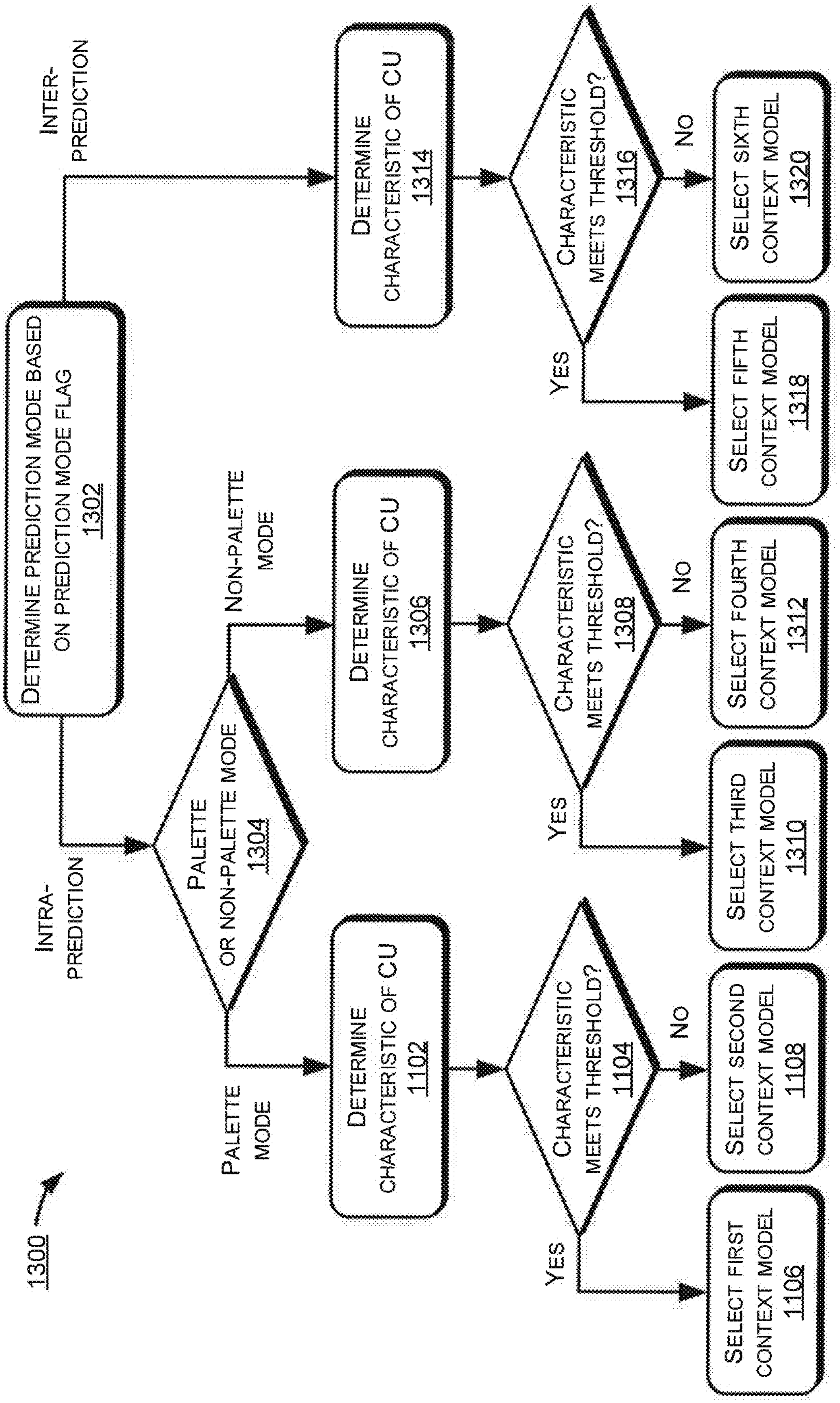
FIG. 13 illustrates an example alternative process prior to the process illustrated in FIG. 11.

FIG. 13 illustrates an example alternative process 1300 prior to the process illustrated in FIG. 11.

At block 1302, a prediction mode of a CU used may be determined based a prediction mode flag associated with the CU. Prior to determining the characteristic of the CU for the intra-prediction mode, whether a coding mode of the CU is a palette mode may be determined based on a signaling palette flag associated with the CU at block 1304. The coding mode of the CU may be determined to be 1) the palette mode if the signaling flag is a palette mode flag having a value of 1, and 2) a non-palette mode if the signaling flag is the palette mode flag having a value of 0. Each mode may then proceed to the process described in FIG. 11. For the non-palette mode, the blocks corresponding to those in FIG. 11 are re-numbered as 1306, 1308, 1310, and 1312. For the inter-prediction mode, such as the CPR, the process may proceed as described in FIG. 11. The blocks for the inter-prediction corresponding to those in FIG. 11 are renumbered as 1314, 1316, 1318, and 1320.

Figure 14:
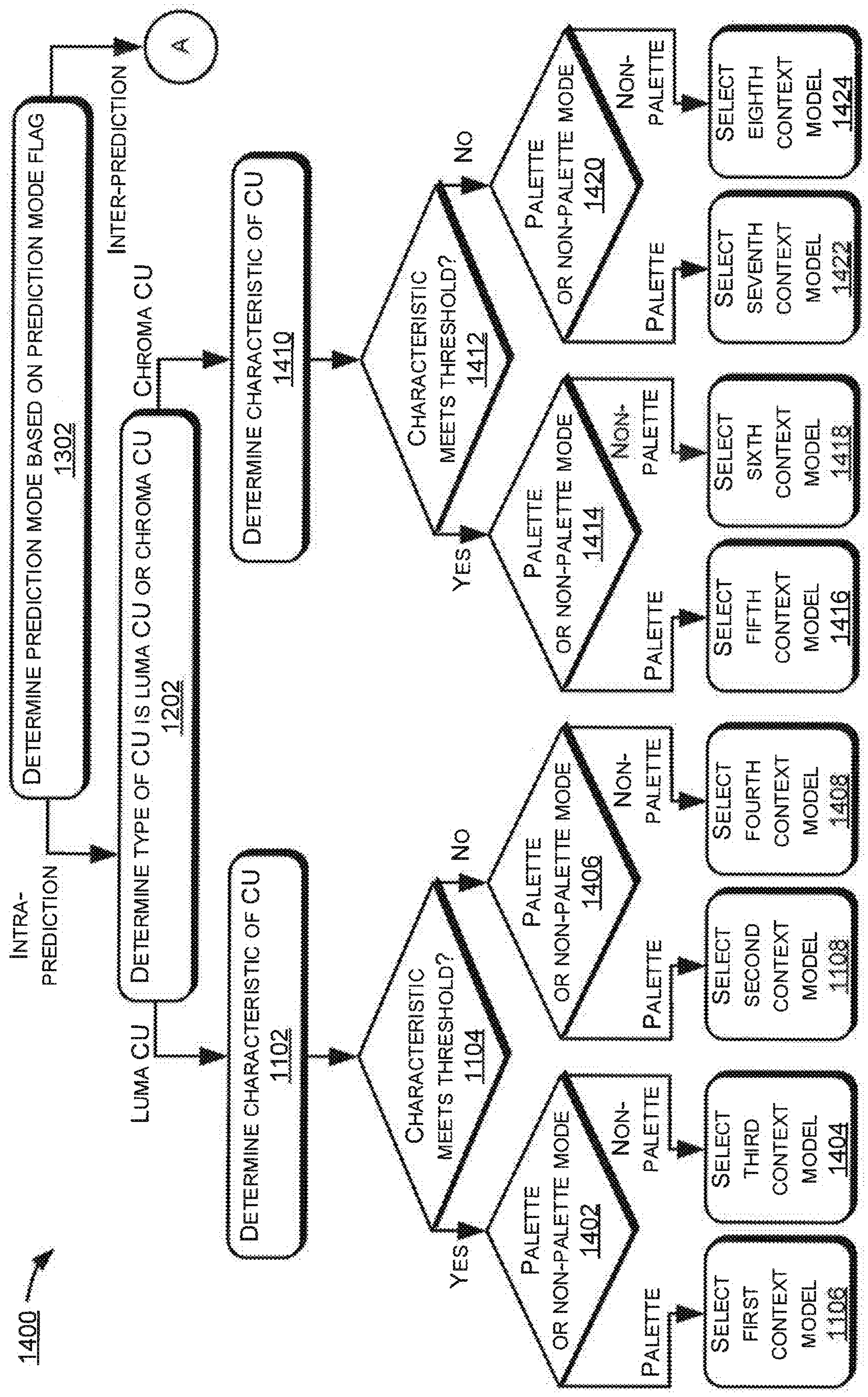
FIG. 14 illustrates an example process combining the processes of FIGS. 12 and 13 for the intra-prediction mode.

FIG. 14 illustrates an example process 1400 combining the processes of FIGS. 12 and 13 for the intra-prediction mode. As previously described with reference to FIGS. 12 and 13, a prediction mode of a CU used may be determined based a prediction mode flag associated with the CU at block 1302, and for the prediction mode of the CU determined to be the intra-prediction mode, whether a type of the CU is a luma CU or chroma CU may be determined at block 1202, and each type may then proceed to the process described in FIG. 11.

Upon determining that the type of the CU is the luma CU at block 1202, a characteristic of the CU, such as a size of the CU, may be determined at block 1102, and whether the characteristic of the CU meets a corresponding threshold may be determined at block 1104. Upon determining that the characteristic of the CU meets the corresponding threshold at block 1104, whether the coding mode of the CU is a palette mode or a non-palette mode may be determined at block 1402 based on a signaling flag. The coding mode of the CU may be determined to be 1) the palette mode if the signaling flag is a palette mode flag having a value of 1, and 2) the non-palette mode if the signaling flag is the palette mode flag having a value of 0. Upon determining that the coding mode is the palette mode, the first context model may be selected at block 1106, or upon determining that the coding mode is the non-palette mode, the third context model may be selected at block 1404. Upon determining that the characteristic of the CU does not meet the corresponding threshold at block 1104, whether the coding mode of the CU is the palette mode or the non-palette mode may be determined at block 1406 based on the signaling flag as described above. Upon determining that the coding mode is the palette mode, the second context model may be selected at block 1108, or upon determining that the coding mode is the non-palette mode, the fourth context model may be selected at block 1408.

Upon determining that the type of the CU is the chroma CU at block 1202, the process follows a similar sequence to the process described above for the luma CU. A characteristic of the CU, such as a size of the CU, may be determined at block 1410, and whether the characteristic of the CU meets a corresponding threshold may be determined at block 1412. Upon determining that the characteristic of the CU meets the corresponding threshold at block 1412, whether the coding mode of the CU is a palette mode or a non-palette mode may be determined at block 1414 based on a signaling flag as described above. Upon determining that the coding mode is the palette mode, a fifth context model may be selected at block 1416, or upon determining that the coding mode is the non-palette mode, the sixth context model may be selected at block 1418. Upon determining that the characteristic of the CU does not meet the corresponding threshold at block 1412, whether the coding mode of the CU is the palette mode or the non-palette mode may be determined at block 1420 based on the signaling flag as described above. Upon determining that the coding mode is the palette mode, the seventh context model may be selected at block 1422, or upon determining that the coding mode is the non-palette mode, the eighth context model may be selected at block 1424.

Figure 15:
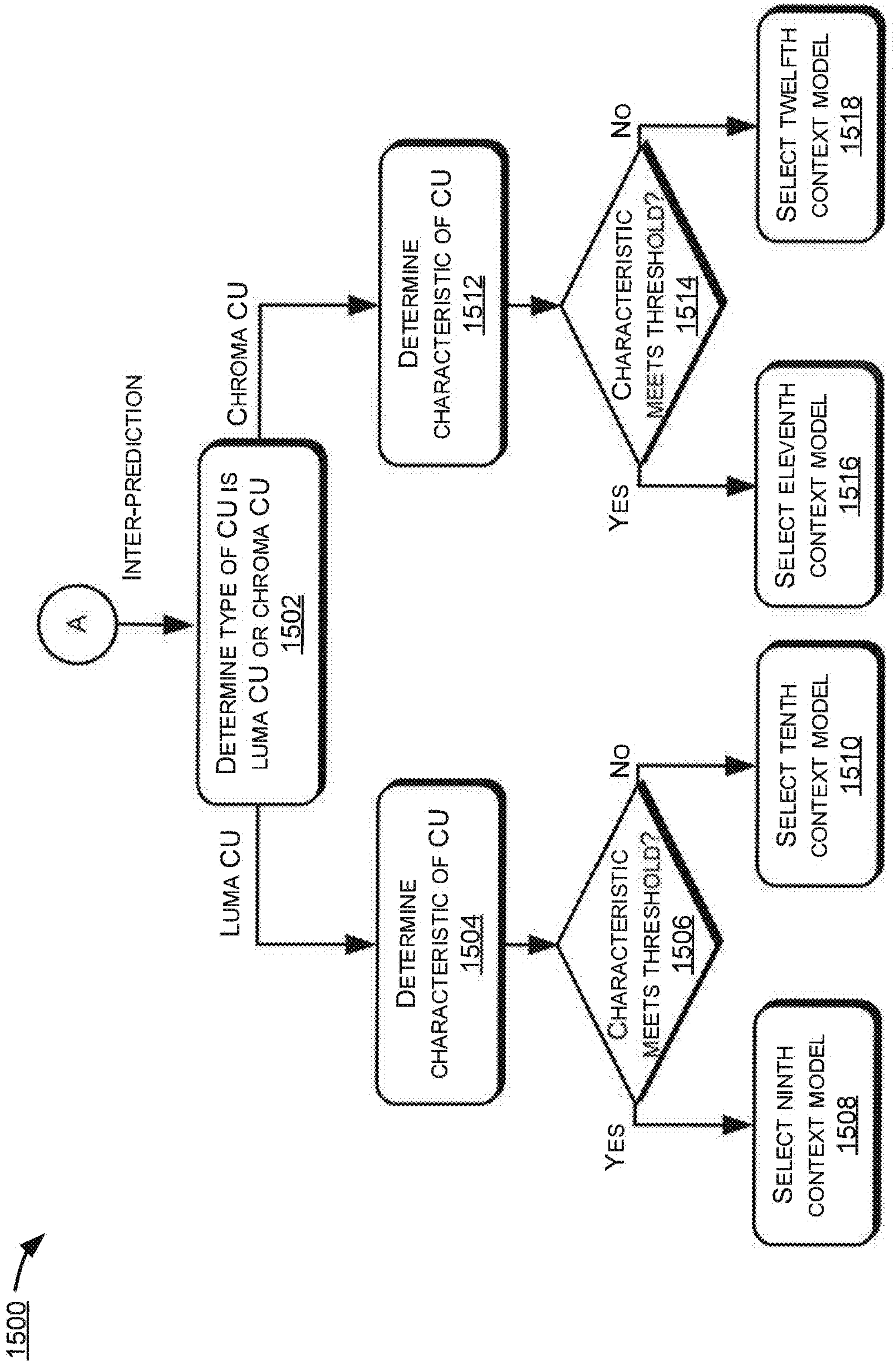
FIG. 15 illustrates an example process of FIG. 14 for the inter-prediction mode.

FIG. 15 illustrates an example process of FIG. 14 for the prediction mode of the CU determined to be the intra-prediction mode at block 1302.

Whether a type of the CU is a luma CU or chroma CU may be determined at block 1502, and each type may then proceed to the process described in FIG. 11.

Upon determining that the type of the CU is the luma CU at block 1502, a characteristic of the CU, such as a size of the CU, may be determined at block 1504, and whether the characteristic of the CU meets a corresponding threshold may be determined at block 1506. Upon determining that the characteristic of the CU meets the corresponding threshold at block 1506, the ninth context model may be selected at block 1508, or upon determining that the characteristic of the CU does not meet the corresponding threshold at block 1506, the tenth context model may be selected at block 1510.

Upon determining that the type of the CU is the chroma CU at block 1502, the process follows a similar sequence to the process described above for the luma CU. A characteristic of the CU, such as a size of the CU, may be determined at block 1512, and whether the characteristic of the CU meets a corresponding threshold may be determined at block 1514. Upon determining that the characteristic of the CU meets the corresponding threshold at block 1514, an eleventh context model may be selected at block 1516, or upon determining that the characteristic of the CU does not meet the corresponding threshold at block 1514, a twelfth context model may be selected at block 1518.

Figure 16:
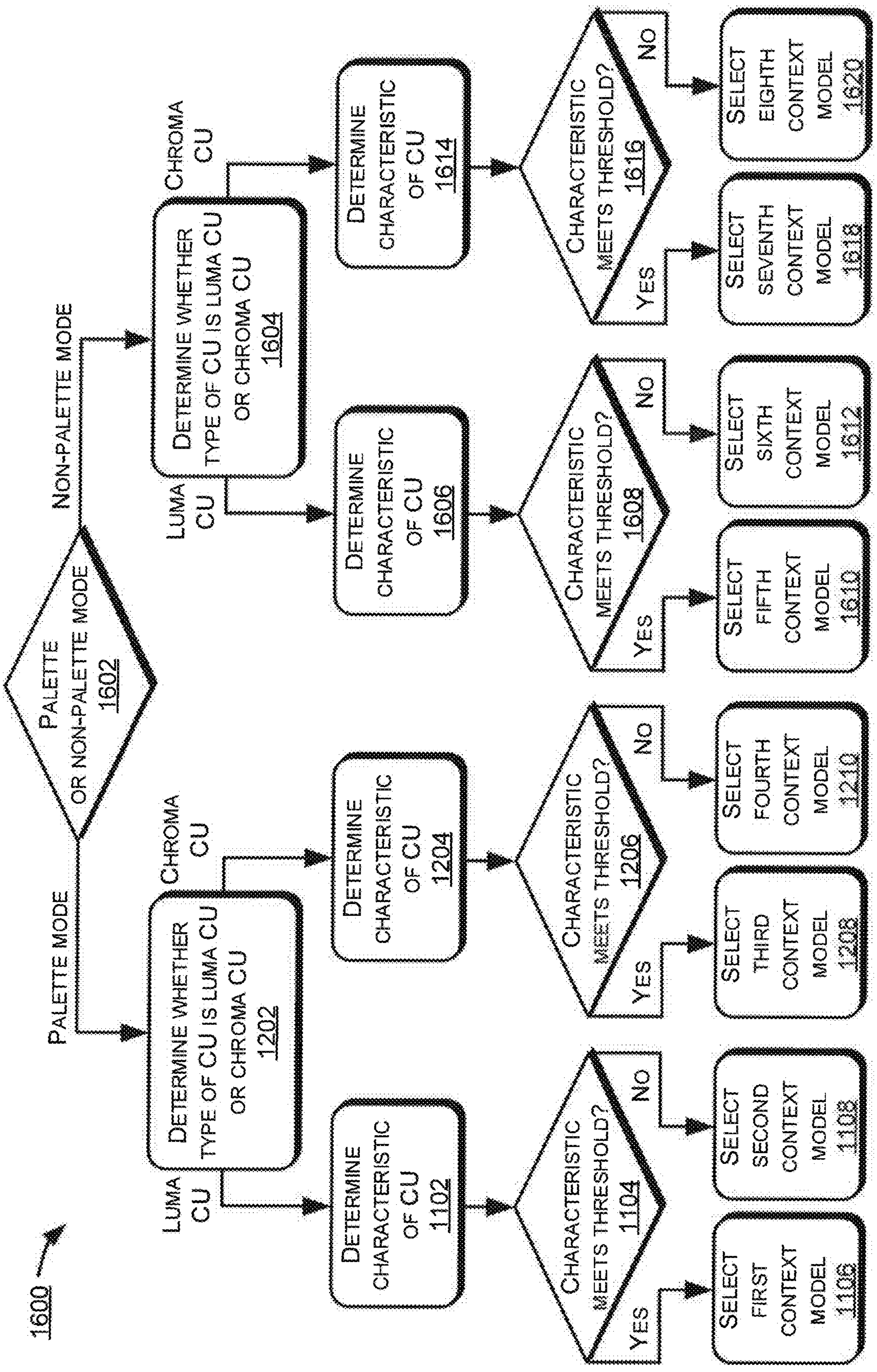
FIG. 16 illustrates an alternative process of combining the processes of FIGS. 12 and 13.

FIG. 16 illustrates an alternative process 1600 combining the processes of FIGS. 12 and 13.

Whether a coding mode of a CU is a palette mode or a non-palette mode may be determined first based on a signaling flag associated with the CU as described above at block 1602. Each mode may then proceed to the process described in FIG. 12 for determining whether a type of the CU is a luma CU or a chroma CU prior to determining the characteristic of the CU. For the non-palette mode, the blocks corresponding to those in FIG. 12 are re-numbered as 1604, 1606, 1608, 1610, 1612, 1614, 1616, 1618, and 1620.

Alternatively, whether a type of the CU is a luma CU or chroma CU may be determined first at block 1602. Each type may then proceed to the process described in FIG. 13 from block 1304 for determining whether a coding mode of the CU is a palette mode or a non-palette mode prior to determining the characteristic of the CU. Further, whether the prediction mode is the intra-prediction mode or the inter-prediction mode based on the prediction mode flag as described with reference to block 1302 may be determined prior to block 1602.

The processes described above in FIGS. 11-16 may be practiced, or executed, in a context-adaptive binary arithmetic coding (CABAC) engine.

Alternatively, the characteristic to be determined at block 1102 of FIG. 11 may include one or more of characteristics of the CU signaled by a signaling flag, such as the coding mode including the palette and prediction mode, and the type (luma or chroma) of the CU in addition to the size of the CU. For example, for the coding mode of the CU as the characteristic of the CU, the characteristic may be considered to meet the threshold if the coding mode were the palette mode and not to meet the threshold if the coding mode were the prediction mode at block 1104, then the process may proceed to blocks 1106 or 1108. For the type of the CU as the characteristic of the CU, the characteristic may be considered to meet the threshold if the CU were a luma CU and not to meet the threshold if the CU were a chroma CU at block 1104, then the process may proceed to blocks 1106 or 1108. The characteristic to be determined may be entered by a user as a desired characteristic to be used for selecting an appropriate context model.

Figure 17:
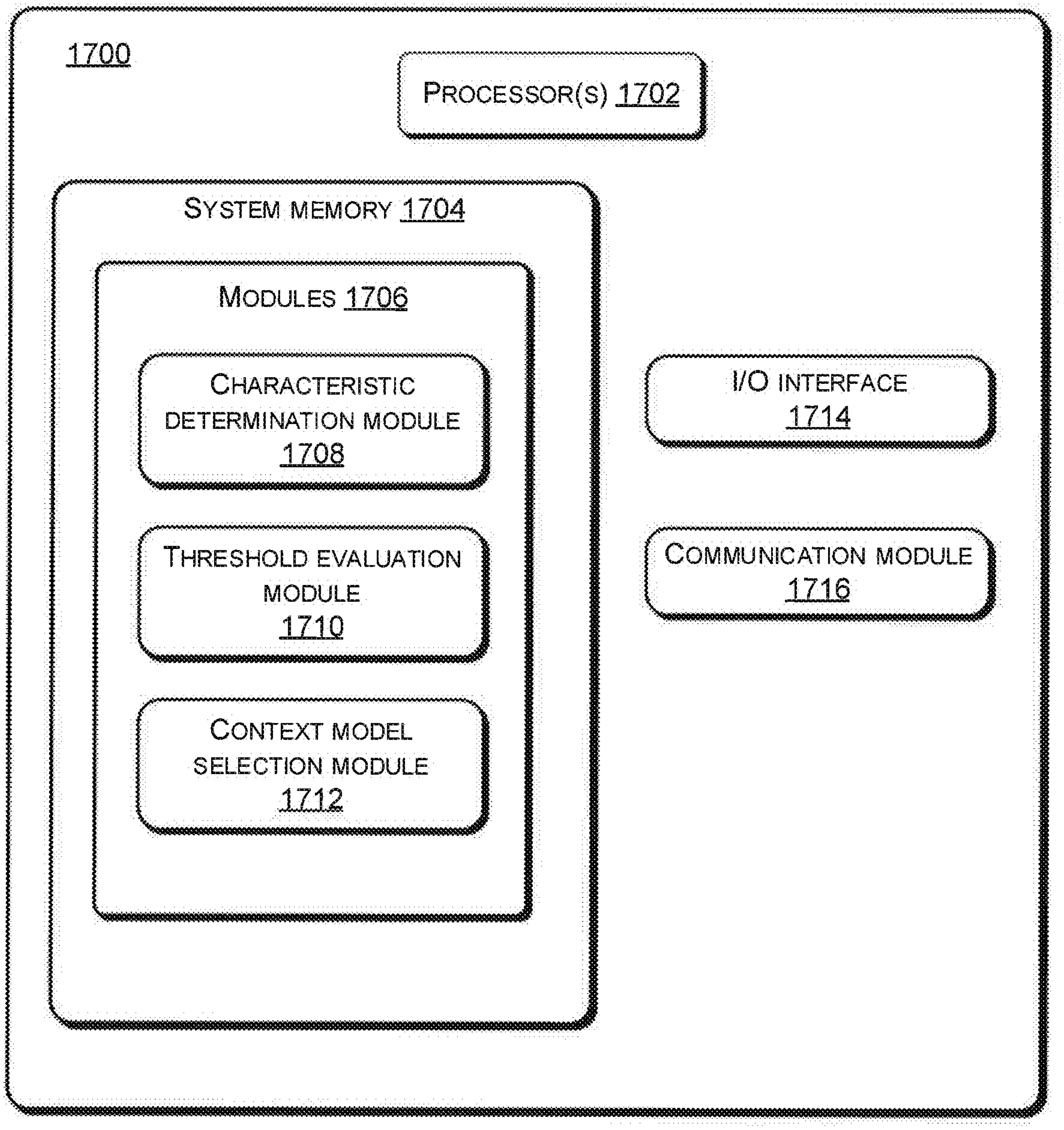
FIG. 17 illustrates an example system for implementing the processes and methods for improving coding accuracy and efficiency by selectively utilizing different context models based on the CU characteristics.

FIG. 17 illustrates an example system 1700 for implementing the processes and methods described above for improving coding accuracy and efficiency by selectively utilizing different context models based on the CU characteristics.

The techniques and mechanisms described herein may be implemented by multiple instances of the system 1700 as well as by any other computing device, system, and/or environment. The system 1700 shown in FIG. 17 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 1600 may include one or more processors 1702 and system memory 1704 communicatively coupled to the processor(s) 1702. The processor(s) 1702 may execute one or more modules and/or processes to cause the processor(s) 1702 to perform a variety of functions. In embodiments, the processor(s) 1702 may include a central processing unit (CPU), a graphics processing unit (GPU), both CPU and GPU, or other processing units or components known in the art. Additionally, each of the processor(s) 1702 may possess its own local memory, which also may store program modules, program data, and/or one or more operating systems.

Depending on the exact configuration and type of the system 1700, the system memory 1704 may be volatile, such as RAM, non-volatile, such as ROM, flash memory, miniature hard drive, memory card, and the like, or some combination thereof. The system memory 1704 may include one or more computer-executable modules (modules) 1706 that are executable by the processor(s) 1702.

The modules 1706 may include, but are not limited to, a characteristic determination module 1708, a threshold evaluation module 1710, and a context model selection module 1712. The characteristic determination module 1708 may be configured to determine a characteristic of a CU, such as a size of the CU, and threshold evaluation module 1710 may determine whether the characteristic of the CU meets a corresponding threshold. The context model selection module 1712 may select a first context model upon the threshold evaluation module 1710 determining that the characteristic of the CU meets a corresponding threshold, and select a second context model upon the threshold evaluation module 1710 determining that the characteristic of the CU fails to meet the corresponding threshold.

The characteristic of the CU may include a size of the CU, and the threshold evaluation module 1710 may determine whether the size of the CU is larger than or equal to the predefined CU size. The size of the CU and the predefined CU size may include a height, a width, and an area of the CU. For example, if the size of the CU were 64 (length)×32 (width), and the threshold, the predefined CU size, were 64 in length, then the characteristic (length) of the CU would meet the threshold because the length of the CU is equal to the threshold of the predefined CU size, which is 64 in length, and the context model selection module 1712 would select the first context model. For the same CU, if the threshold were the predefined CU width of 64, then the CU would fail to meet the threshold because the width of the CU, being 34, is not greater than or equal to the threshold of the predefined CU size, which is 64, and the context model selection module 1712 would select the second context model. The characteristic of the CU may be signaled in a header of one of syntax elements, such as sequences header, picture header, or slice header.

The characteristic determination module 1708 may be further configured to determine, as a characteristic of the CU, whether a type of the CU is a luma CU or a chroma CU, and to determine a coding mode of the CU based on a signaling flag associated with the CU. For example, for the coding mode of the CU as the characteristic of the CU, the threshold evaluation module 1710 may determine the coding mode to meet the threshold if the coding mode were the palette mode and not to meet the threshold if the coding mode were the prediction mode. The context model selection module 1712 may then select the first or the second context model accordingly. For the type of the CU as the characteristic of the CU, the threshold evaluation module may determine that the type of the CU to meet the threshold if the CU were a luma CU and not to meet the threshold if the CU were a chroma CU. The context model selection module 1712 may then select the first or the second context model accordingly. The characteristic to be determined may be entered by a user as a desired characteristic to be used for selecting an appropriate context model. With reference to FIGS. 13-17, the signaling flag is described as being the palette mode flag or the prediction mode flag as examples, and the signaling flag may include any flag associated with a property or characteristic of the CU.

The system 1700 may additionally include an input/output (I/O) interface 1714 for receiving data associated with a CU, such as the characteristics of the CU and for outputting the selected context model for the CU. The system 1700 may also include a communication module 1716 allowing the system 1700 to communicate with other devices (not shown) over a network (not shown). The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-17. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

EXAMPLE CLAUSES

A. A method comprising: determining a characteristic of a coding unit (CU); determining whether the characteristic of the CU meets a corresponding threshold; and upon determining that the characteristic of the CU meets the corresponding threshold, selecting a first context model, or upon determining that the characteristic of the CU fails to meet the corresponding threshold, selecting a second context model.

B. The method as paragraph A recites, wherein the characteristic of the CU includes a signaling flag associated with the CU, determining that the characteristic of the CU meets the corresponding threshold if the signaling flag associated with the CU is a palette flag, and determining that the characteristic of the CU fails to meet the corresponding threshold if the signaling flag associated with the CU is a prediction flag.

C. The method as paragraph A recites, wherein the characteristic of the CU includes a type of the CU, determining that the characteristic of the CU meets the corresponding threshold if the type of the CU is a luma CU, and determining that the characteristic of the CU fails to meet the corresponding threshold if the type of the CU is a chroma CU.

D. The method as paragraph A recites, wherein determining whether the characteristic of the CU meets the corresponding threshold includes determining whether a size of the CU is larger than or equal to the predefined CU size; and selecting the first context model upon determining that the size of the CU is larger than or equal to a predefined CU size, or selecting the second context model upon determining that the size of the CU is smaller than the predefined CU size.

E. The method as paragraph D recites, wherein the size of the CU and the predefined CU size include: a height of the CU, a width of the CU, and an area of the CU.

F. The method as paragraph E recites, further comprising, prior to determining the characteristic of the CU: determining whether a type of the CU is a luma CU or a chroma CU.

G. The method as paragraph F recites, upon determining that the type of the CU is the luma CU, further comprising: after determining that the characteristic of the CU meets the corresponding threshold, determining a coding mode of the CU based on a signaling flag associated with the CU; and determining that the coding mode of the CU is a palette mode if the signaling flag is a palette mode flag having a value of 1 and selecting the first context model, or determining that the coding mode of the CU is a non-palette mode if the signaling flag is the palette mode flag having a value of 0 and selecting a third context model; and after determining that the characteristic of the CU fails to meet the corresponding threshold, determining the coding mode of the CU based on the signaling flag associated with the CU, and determining that the coding mode of the CU is the palette mode if the signaling flag is the palette mode flag having a value of 1 and selecting the second context model, or determining that the coding mode of the CU is the non-palette mode if the signaling flag is the palette mode flag having a value of 0 and selecting a fourth context model.

H. The method as paragraph F recites, upon determining that the type of the CU is the chroma CU, further comprising: after determining that the characteristic of the CU meets the corresponding threshold, determining a coding mode of the CU based on a signaling flag associated with the CU; and determining that the coding mode of the CU is a palette mode if the signaling flag is a palette mode flag having a value of 1 and selecting the fifth context model, or determining that the coding mode of the CU is a non-palette mode if the signaling flag is the palette mode flag having a value of 0 and selecting a sixth context model; and after determining that the characteristic of the CU fails to meet the corresponding threshold, determining the coding mode of the CU based on the signaling flag associated with the CU, determining that the coding mode of the CU is the palette mode if the signaling flag is the palette mode flag having a value of 1 and selecting the seventh context model, or determining that the coding mode of the CU is the non-palette mode if the signaling flag is the palette mode flag having a value of 0 and selecting an eighth context model.

I. The method as paragraph A recites, wherein the characteristic of the CU is signaled in a header of one of syntax elements.

J. The method as paragraph A recites, wherein the method is executed in a context-adaptive binary arithmetic coding (CABAC) engine.

K. A system comprising: one or more processors; and memory communicatively coupled to the one or more processors, the memory storing computer-executable modules executable by the one or more processors that, when executed by the one or more processors, perform associated operations, the computer-executable modules including: a characteristic determination module configured to determine a characteristic of a coding unit (CU); a threshold evaluation module configured to determine whether the characteristic of the CU meets a corresponding threshold; and a context model selection module configured to: select a first context model upon the threshold evaluation module determining that the characteristic of the CU meets a corresponding threshold, and select a second context model upon the threshold evaluation module determining that the characteristic of the CU fails to meet the corresponding threshold.

L. The system as paragraph K recites, if the characteristic determination module determines the characteristic of the CU to be a signaling flag associated with the CU, the context model selection module is further configured to: select the first context model upon the threshold evaluation module determining that the signaling flag associated with the CU is a palette flag, and select the second context model upon the threshold evaluation module determining that the signaling flag associated with the CU is a prediction flag.

M. The system as paragraph K recites, if the characteristic determination module determines the characteristic of the CU to be a type of the CU, the context model selection module is further configured to: select the first context model upon the threshold evaluation module determining that the type of the CU is a luma CU, and select the second context model upon the threshold evaluation module determining that the type of the CU is a chroma CU.

N. The system as paragraph K recites, if the characteristic determination module determines the characteristic of the CU to be a size of the CU, the context model selection module is further configured to: select the first context model upon the threshold evaluation module determining that the size of the CU is larger than or equal to a predefined CU size, and select the second context model upon the threshold evaluation module determining that the size of the CU is smaller than the predefined CU size.

O. The system as paragraph N recites, wherein the size of the CU and the predefined CU size include: a height of the CU, a width of the CU, and an area of the CU.

P. The system as paragraph O recites, wherein the characteristic determination module is further configured to determine whether a type of the CU is a luma CU or a chroma CU.

Q. The system as paragraph P recites, wherein the characteristic determination module is further configured to: determine a coding mode of the CU based on a signaling flag associated with the CU; determine that the coding mode of the CU is a palette mode if the signaling flag is a palette mode flag having a value of 1; and determine that the coding mode of the CU is a non-palette mode if the signaling flag is the palette mode flag having a value of 0.

R. The system as paragraph K recites, wherein the characteristic of the CU is signaled in a header of one of syntax elements.

S. The system as paragraph K recites, wherein the system includes a context-adaptive binary arithmetic coding (CABAC) engine.

T. A computer-readable storage medium storing computer-readable instructions executable by one or more processors, that when executed by the one or more processors, cause the one or more processors to perform operations comprising: determining a characteristic of the CU; determining whether the characteristic of the CU meets a corresponding threshold; and upon determining that characteristic of the CU meets the corresponding threshold, selecting a first context model, or upon determining that characteristic of the CU fails to meet the corresponding threshold, selecting a second context model.

U. The computer-readable storage medium as paragraph T recites, wherein the characteristic of the CU includes a signaling flag associated with the CU, determining that the characteristic of the CU meets the corresponding threshold if the signaling flag associated with the CU is a palette flag, and determining that the characteristic of the CU fails to meet the corresponding threshold if the signaling flag associated with the CU is a prediction flag.

V. The computer-readable storage medium as paragraph T recites, wherein the characteristic of the CU includes a type of the CU, determining that the characteristic of the CU meets the corresponding threshold if the type of the CU is a luma CU, and determining that the characteristic of the CU fails to meet the corresponding threshold if the type of the CU is a chroma CU.

W. The computer-readable storage medium as paragraph T recites, wherein determining whether the characteristic of the CU meets the corresponding threshold includes determining whether a size of the CU is larger than or equal to the predefined CU size; and selecting the first context model upon determining that the size of the CU is larger than or equal to the predefined CU size, or selecting the second context model upon determining that the size of the CU is smaller than the predefined CU size.

X. The computer-readable storage medium as paragraph W recites, wherein the operations further comprise, prior to determining the characteristic of the CU: determining whether a type of the CU is a luma CU or a chroma CU.

Y. The computer-readable storage medium as paragraph X recites, wherein the operations further comprise, upon determining that the type of the CU is the luma CU: after determining that the characteristic of the CU meets the corresponding threshold, determining a coding mode of the CU based on a signaling flag associated with the CU; and determining that the coding mode of the CU is a palette mode if the signaling flag is a palette mode flag having a value of 1 and selecting the first context model, or determining that the coding mode of the CU is a non-palette mode if the signaling flag is the palette mode flag having a value of 0 and selecting a third context model; and after determining that the characteristic of the CU fails to meet the corresponding threshold, determining the coding mode of the CU based on the signaling flag associated with the CU, determining that the coding mode of the CU is the palette mode if the signaling flag is the palette mode flag having a value of 1 and selecting the second context model, or determining that the coding mode of the CU is the non-palette mode if the signaling flag is the palette mode flag having a value of 0 and selecting a fourth context model.

Z. The computer-readable storage medium as paragraph X recites, wherein the operations further comprise, upon determining that the type of the CU is the chroma CU: after determining that the characteristic of the CU meets the corresponding threshold, determining a coding mode of the CU based on a signaling flag associated with the CU; and determining that the coding mode of the CU is a palette mode if the signaling flag is a palette mode flag having a value of 1 and selecting the fifth context model, or determining that the coding mode of the CU is a non-palette mode if the signaling flag is the palette mode flag having a value of 0 and selecting a sixth context model; and after determining that the characteristic of the CU fails to meet the corresponding threshold, determining the coding mode of the CU based on the signaling flag associated with the CU, determining that the coding mode of the CU is the palette mode if the signaling flag is the palette mode flag having a value of 1 and selecting the seventh context model, or determining that the coding mode of the CU is the non-palette mode if the signaling flag is the palette mode flag having a value of 0 and selecting an eighth context model.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:

determining a characteristic of a coding unit (CU), the characteristic including a signaling flag associated with the CU, a type of the CU, and a size of the CU;

selecting a first context model for the coding unit (CU) based at least in part upon:

determining that the signaling flag associated with the CU is a palette flag, determining that the type of the CU is a luma CU, and determining that the size of the CU is larger than or equal to a corresponding predefined CU size; and selecting a second context model for the CU based at least in part upon:

determining that the signaling flag associated with the CU is the palette flag, and determining that the size of the CU is smaller than the corresponding predefined CU size.

2. The method of claim 1, wherein the size of the CU includes:

a height of the CU, a width of the CU, and an area of the CU.

3. The method of claim 1, wherein selecting the first context model includes selecting the first context model in response to determining that a coding mode of the CU is a palette mode based on the signaling flag being a palette mode flag having a value of 1, selecting the first context model, and wherein selecting the second context model includes selecting the second context model in response to determining that the coding mode of the CU is the palette mode based on the signaling flag being the palette mode flag having a value of 1, the method further comprising:

selecting a third context model in response to determining that the size of the CU is larger than or equal to the corresponding predefined CU size and determining that the coding mode of the CU is a non-palette mode based on the signaling flag being the palette mode flag having a value of 0; and selecting a fourth context model in response to determining that the size of the CU is smaller than the corresponding predefined CU size and determining that the coding mode of the CU is the non-palette mode based on the signaling flag being the palette mode flag having a value of 0.

4. The method of claim 1, further comprising:

selecting a fifth context model in response to determining that the size of the CU is larger than or equal to the corresponding predefined CU size and determining that the coding mode of the CU is a palette mode based on the signaling flag being a palette mode flag having a value of 1;

selecting a sixth context model in response to determining that the size of the CU is larger than or equal to the corresponding predefined CU size and determining that the coding mode of the CU is a non-palette mode based on the signaling flag being the palette mode flag having a value of 0;

selecting the seventh context model in response to determining that the size of the CU is smaller than the corresponding predefined CU size and determining that the coding mode of the CU is the palette mode based on the signaling flag being the palette mode flag having a value of 1; and selecting an eighth context model in response to determining that the size of the CU is smaller than the corresponding predefined CU size and determining that the coding mode of the CU is the non-palette mode based on the signaling flag being the palette mode flag having a value of 0.

5. The method of claim 1, wherein the characteristic of the CU is signaled in a header of one of syntax elements.

6. The method of claim 1, wherein the method is executed in a context-adaptive binary arithmetic coding (CABAC) engine.

7. A system comprising:

one or more processors; and memory communicatively coupled to the one or more processors, the memory storing computer-executable modules executable by the one or more processors that, when executed by the one or more processors, perform associated operations, the computer-executable modules including:

a characteristic determination module configured to determine a characteristic of a coding unit (CU), the characteristic including a signaling flag associated with the CU, a type of the CU, and a size of the CU;

a threshold evaluation module configured to evaluate the characteristic of the CU; and a context model selection module configured to:

select a first context model based at least in part upon:

the threshold evaluation module determining that the signaling flag associated with the CU is a palette flag and the size of the CU is larger than or equal to a corresponding predefined CU size, and the characteristic determination module determining that the type of the CU is a luma CU, and select a second context model based at least in part upon:
the threshold evaluation module determining that the signaling flag associated with the CU is the palette flag and the size of the CU is smaller than the corresponding predefined CU size.

8. The system of claim 7, wherein the size of the CU and the predefined CU size include:
a height of the CU,
a width of the CU, and
an area of the CU.

9. The system of claim 7, wherein:
upon the characteristic determination module determining that the characteristic of the type of the CU is the luma CU,
the threshold evaluation module is further configured to, upon determining that the size of the CU is larger than or equal to the corresponding predefined CU size:
determine that a coding mode of the CU is a palette mode based on the signaling flag being a palette mode flag having a value of 1; and
determine that the coding mode of the CU is a non-palette mode based on the signaling flag being the palette mode flag having a value of 0; and
the context model selection module is further configured to:
select the first context model when the coding mode is determined to be the palette mode; and
select a third context model when the coding mode is determined to be the non-palette mode.

10. The system of claim 7, wherein the characteristic of the CU is signaled in a header of one of syntax elements.

11. The system of claim 7, wherein the system includes a context-adaptive binary arithmetic coding (CABAC) engine.

12. A non-transitory computer-readable storage medium storing computer-readable instructions executable by one or more processors, that when executed by the one or more processors, cause the one or more processors to perform operations comprising:
determining a characteristic of the CU, the characteristic including a signaling flag associated with the CU, a type of the CU, and a size of the CU;
selecting a first context model for the coding unit (CU) based at least in part upon:
determining that the signaling flag associated with the CU is a palette flag,
determining that the type of the CU is a luma CU, and
determining that the size of the CU is larger than or equal to a corresponding predefined CU size; and
selecting a second context model for the CU based at least in part upon:
determining that the signaling flag associated with the CU is the palette flag, and
determining that the size of the CU is smaller than the corresponding predefined CU size.

13. The non-transitory computer-readable storage medium of claim 12,
wherein selecting the first context model includes selecting the first context model in response to determining that a coding mode of the CU is a palette mode based on the signaling flag being a palette mode flag having a value of 1, selecting the first context model, and
wherein selecting the second context model includes selecting the second context model in response to determining that the coding mode of the CU is the palette mode based on the signaling flag being the palette mode flag having a value of 1,
the operations further comprise:
selecting a third context model in response to determining that the size of the CU is larger than or equal to the corresponding predefined CU size and determining that the coding mode of the CU is a non-prediction mode based on the signaling flag being the palette mode flag having a value of 0, selecting a third context model; and
selecting a fourth context model in response to determining that the size of the CU is smaller than the corresponding predefined CU size and n determining that the coding mode of the CU is the non-palette mode based on the signaling flag being
the palette mode flag having a value of 0.

14. The non-transitory computer-readable storage medium of claim 12,
wherein the operations further comprise:
selecting a fifth context model in response to determining that the size of the CU the is larger than or equal to corresponding predefined CU size; and determining that the coding mode of the CU is a palette mode base on the signaling flag being a palette mode flag having a value of 1;
selecting a sixth context model in response to determining that the size of the CU is larger than or equal to the corresponding predefined CU size and determining that the coding mode of the CU is a non-palette mode based on the signaling flag being the palette mode flag having a value of 0
selecting the seventh context model in response to determining that the size of the CU is smaller than the corresponding predefined CU size and determining that the coding mode of the CU is the palette mode based on the signaling flag being the palette mode flag having a value of 1; and
selecting an eighth context model in response to determining that the size of the CU is smaller than the corresponding predefined CU size and determining that the coding mode of the CU is the non-palette mode if the signaling flag is the palette mode flag having a value of 0.

15. The non-transitory computer-readable storage medium of claim 12, wherein the size of the CU includes:
a height of the CU,
a width of the CU,
and an area of the CU.

16. The non-transitory computer-readable storage medium of claim 12, wherein the characteristic of the CU is signaled in a header of one of syntax elements.

17. The system of claim 7, wherein:
upon the characteristic determination module determining that the type of the CU is the luma CU,
the threshold evaluation module is further configured to, upon determining that the size of the CU is smaller than the corresponding predefined CU size:
determine that a coding mode of the CU is a palette mode based on the signaling flag being a palette mode flag having a value of 1; and
determine that the coding mode of the CU is a non-palette mode based on the signaling flag being the palette mode flag having a value of 0; and
the context model selection module is further configured to:
select the second context model when the coding mode is determined to be the palette mode; and select a fourth context model when the coding mode is determined to be the non-palette mode.

18. The system of claim 7, wherein:

upon the characteristic determination module determining that the type of the CU is the luma CU, the threshold evaluation module is further configured to, upon determining that the size of the CU is larger than or equal to the corresponding predefined CU size:

determine that a coding mode of the CU is a palette mode based on the signaling flag being a palette mode flag having a value of 1; and determine that the coding mode of the CU is a non-palette mode based on the signaling flag being the palette mode flag having a value of 0; and the context model selection module is further configured to:

select a fifth context model when the coding mode is determined to be the palette mode; and select a sixth context model when the coding mode is determined to be the non-palette mode.

19. The system of claim 7, wherein:

upon the characteristic determination module determining that the type of the CU is the chroma CU, the threshold evaluation module is further configured to, upon determining that the size of the CU is smaller than the corresponding predefined CU size:

determine that a coding mode of the CU is a palette mode based on the signaling flag being a palette mode flag having a value of 1; and determine that the coding mode of the CU is a non-palette mode based on the signaling flag being the palette mode flag having a value of 0; and the context model selection module is further configured to:

select a seventh context model when the coding mode is determined to be the palette mode; and select an eighth context model when the coding mode is determined to be the non-palette mode.

* * * * *